United States Patent
Park et al.

(10) Patent No.: US 10,193,972 B2
(45) Date of Patent: *Jan. 29, 2019

(54) SHARED DATA TRANSMITTING METHOD, SERVER, AND SYSTEM

(71) Applicant: Samsung Electronics Co., Ltd., Gyeonggi-do (KR)

(72) Inventors: Se-jun Park, Gyeonggi-do (KR); Ji-young Kwahk, Gyeonggi-do (KR); Hee-jeong Choo, Gyeonggi-do (KR); Jin-young Jeon, Seoul (KR); Jong-rim Lee, Seoul (KR); Keum-koo Lee, Gyeonggi-do (KR); Ju-yun Sung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,584

(22) Filed: Jun. 7, 2017

(65) Prior Publication Data

US 2017/0272517 A1    Sep. 21, 2017

Related U.S. Application Data

(63) Continuation of application No. 12/860,552, filed on Aug. 20, 2010, now Pat. No. 9,686,354.

(30) Foreign Application Priority Data

Aug. 21, 2009   (KR) .................. 10-2009-0077506
Nov. 6, 2009    (KR) .................. 10-2009-0107230

(51) Int. Cl.
   *H04L 29/08*   (2006.01)
(52) U.S. Cl.
   CPC ......... *H04L 67/1095* (2013.01); *H04L 67/16* (2013.01); *H04L 67/28* (2013.01); *H04L 67/2823* (2013.01)

(58) Field of Classification Search
   None
   See application file for complete search history.

(56) References Cited

U.S. PATENT DOCUMENTS

| | | | |
|---|---|---|---|
| 6,928,439 B2 | 8/2005 | Satoh | |
| 7,233,933 B2 * | 6/2007 | Horvitz | G06Q 10/109 706/21 |

(Continued)

FOREIGN PATENT DOCUMENTS

| | | |
|---|---|---|
| CN | 1838599 | 9/2006 |
| CN | 1838604 | 9/2006 |

(Continued)

OTHER PUBLICATIONS

Decision to Refuse dated Jul. 4, 2017 issued in counterpart application No. 10173583.5-1954, 12 pages.

(Continued)

*Primary Examiner* — Backhean Tiv
(74) *Attorney, Agent, or Firm* — The Farrell Law Firm, P.C.

(57) ABSTRACT

A method of transmitting data performed by a server through a network, a method of transmitting data in an ad hoc network, a server, and a data transmitting system are provided. The method of transmitting data performed by a server through a network includes receiving and storing data from a device of a first user; detecting that a device of a second user accesses the server; selecting data from the stored data based on user information; processing the selected data to be optimized for the device of the second user; and transmitting the processed data to the device of the second user, wherein the server is configured to combine data received from a plurality of devices of the first user and transmit the combined data to the device of the second user.

20 Claims, 24 Drawing Sheets

(56) References Cited

U.S. PATENT DOCUMENTS

| | | | |
|---|---|---|---|
| 7,801,971 B1* | 9/2010 | Amidon | H04L 51/32 709/200 |
| 7,958,352 B2* | 6/2011 | Edgett | H04L 63/08 713/164 |
| 8,013,734 B2* | 9/2011 | Saigh | H04M 1/72541 340/539.1 |
| 8,090,369 B2* | 1/2012 | Kitazoe | H04W 8/22 455/432.1 |
| 8,112,548 B2 | 2/2012 | Cui et al. | |
| 8,379,065 B2* | 2/2013 | Nam | G06F 3/14 345/3.3 |
| 8,402,274 B2 | 3/2013 | Jun | |
| 8,533,844 B2* | 9/2013 | Mahaffey | G06F 21/564 709/203 |
| 8,806,000 B1* | 8/2014 | Wattenhofer | G06F 17/2247 709/224 |
| 9,686,354 B2* | 6/2017 | Park | H04L 67/1095 |
| 2002/0059236 A1 | 5/2002 | Satoh | |
| 2002/0068558 A1* | 6/2002 | Janik | H04L 12/2898 455/426.1 |
| 2002/0073331 A1* | 6/2002 | Candelore | G06F 21/6245 726/3 |
| 2003/0046548 A1* | 3/2003 | Brown | G06F 21/10 713/182 |
| 2003/0229892 A1* | 12/2003 | Sardera | H04N 7/17309 725/9 |
| 2004/0003042 A1* | 1/2004 | Horvitz | G06Q 10/109 709/204 |
| 2005/0066219 A1* | 3/2005 | Hoffman | G06F 21/6218 714/4.1 |
| 2005/0155072 A1* | 7/2005 | Kaczowka | G11B 27/005 725/95 |
| 2006/0020904 A1* | 1/2006 | Aaltonen | G06F 3/048 715/850 |
| 2006/0069687 A1 | 3/2006 | Cui et al. | |
| 2006/0069998 A1* | 3/2006 | Artman | G06F 17/30994 715/721 |
| 2006/0085731 A1 | 4/2006 | Cui et al. | |
| 2006/0123010 A1* | 6/2006 | Landry | G06F 17/30575 |
| 2006/0218181 A1 | 9/2006 | Jeon | |
| 2006/0218401 A1 | 9/2006 | Jun | |
| 2006/0253551 A1* | 11/2006 | Jun | H04L 67/1095 709/219 |
| 2007/0014243 A1 | 1/2007 | Meyer et al. | |
| 2007/0168419 A1* | 7/2007 | Sciammarella | H04L 67/06 709/204 |
| 2007/0180488 A1* | 8/2007 | Walter | H04N 5/783 725/135 |
| 2007/0226365 A1* | 9/2007 | Hildreth | G11B 27/034 709/231 |
| 2007/0270099 A1 | 11/2007 | Le Gars | |
| 2008/0005348 A1* | 1/2008 | Kosiba | H04L 29/06027 709/231 |
| 2008/0114834 A1* | 5/2008 | Miyazaki | G06F 17/30209 709/204 |
| 2008/0270533 A1 | 10/2008 | Li et al. | |
| 2009/0125571 A1* | 5/2009 | Kiilerich | G06F 17/30017 |
| 2009/0150525 A1 | 6/2009 | Edgett et al. | |
| 2009/0172565 A1* | 7/2009 | Jackson | H04L 67/1095 715/753 |
| 2009/0221307 A1* | 9/2009 | Wolak | G06Q 10/10 455/466 |
| 2009/0232129 A1* | 9/2009 | Wong | H04M 7/0024 370/352 |
| 2009/0307227 A1* | 12/2009 | Prestenback | H04N 7/17318 |
| 2009/0307261 A1* | 12/2009 | Lindley | G06F 17/30038 |
| 2011/0041072 A1 | 2/2011 | Jeon | |
| 2011/0047248 A1 | 2/2011 | Park et al. | |
| 2011/0047278 A1* | 2/2011 | Penston | G06F 17/30176 709/227 |
| 2011/0072039 A1* | 3/2011 | Tayloe | G06F 21/6218 707/769 |
| 2011/0143811 A1* | 6/2011 | Rodriguez | G06K 9/00986 455/556.1 |
| 2011/0283185 A1* | 11/2011 | Obasanjo | G06F 17/3089 715/243 |
| 2012/0030714 A1* | 2/2012 | Sweatt, III | H04H 60/72 725/54 |
| 2012/0290640 A1* | 11/2012 | Mahaffey | G06F 21/564 709/203 |
| 2017/0272517 A1* | 9/2017 | Park | H04L 67/1095 |

FOREIGN PATENT DOCUMENTS

| | | |
|---|---|---|
| CN | 1838630 | 9/2006 |
| CN | 101076024 | 11/2007 |
| CN | 101179462 | 5/2008 |
| CN | 101263699 | 9/2008 |
| CN | 101341721 | 1/2009 |
| CN | 101997907 | 7/2016 |
| JP | 08-237329 | 9/1996 |
| JP | 11-296455 | 10/1999 |
| JP | 2001-005747 | 1/2001 |
| JP | 2001-188699 | 7/2001 |
| JP | 2003-271644 | 9/2003 |
| JP | 2008-515082 | 5/2008 |
| JP | 2009-087040 | 4/2009 |
| JP | 2009-099142 | 5/2009 |
| KR | 1020040108292 | 12/2004 |
| KR | 1020060102684 | 9/2006 |
| KR | 1020060102686 | 9/2006 |
| KR | 1020060121455 | 11/2006 |
| KR | 1020070047031 | 5/2007 |
| KR | 1020090068917 | 6/2009 |
| WO | WO 2006/124277 | 11/2006 |
| WO | WO 2007/031708 | 3/2007 |
| WO | WO 2008/016853 | 2/2008 |

OTHER PUBLICATIONS

Chinese Office Action dated Feb. 2, 2015 issued in counterpart application No. 201010259814.9.

Australian Examination Report dated Feb. 17, 2015 issued in counterpart application No. 2010284807.

Japanese Office Action dated Mar. 2, 2015 issued in counterpart application No. 2010-186285.

European Examination Report dated Mar. 11, 2015 issued in counterpart application No. 10173583.5.

Korean Office Action dated Dec. 1, 2015 issued in counterpart application No. 10-2009-0077506, 8 pages.

Korean Office Action dated Jan. 20, 2016 issued in counterpart application No. 10-2009-0107230, 11 pages.

Summons to Attend Oral Proceedings dated Feb. 1, 2017 issued in counterpart application No. 10173583.5, 6 pages.

Notice of Acceptance dated Jun. 30, 2015 issued in counterpart application No. 2010284807, 3 pages.

Chinese Office Action dated Sep. 6, 2015 issued in counterpart application No. 201010259814.9, 9 pages.

European Search Report dated Jan. 30, 2018 issued in counterpart application No. 17189282.1-1224, 6 pages.

Chinese Office Action dated Sep. 19, 2018 issued in counterpart application No. 201610374936.X, 13 pages.

* cited by examiner

SHARED DATA TRANSMITTING METHOD, SERVER, AND SYSTEM

PRIORITY

This continuation application claims priority under 35 U.S.C. § 120 to U.S. patent application Ser. No. 12/860,552, filed on Aug. 20, 2010 in the United States Patent and Trademark Office, which claimed priority under 35 U.S.C. § 119(a) to Korean Patent Application Nos. 10-2009-0077506, filed on Aug. 21, 2009, and 10-2009-0107230, filed on Nov. 6, 2009, in the Korean Intellectual Property Office, the entire disclosure of each of which is incorporated herein by reference.

BACKGROUND OF THE INVENTION

1. Field of the Invention

The present invention relates generally to a data transmitting method, server, and system, and more specifically, to a method for transmitting shared data, a server and a shared data transmitting system to share the data with other devices.

2. Description of the Related Art

Mobile terminals have evolved to include various functions as technologies in electronic engineering, communication engineering, terminal devices, and others have rapidly developed. Such development in wireless communication technologies and data processing enables users to utilize functions to play contents or to wirelessly connect to the Internet as well as to voice call by utilizing mobile terminal devices.

The mobile terminal devices enable user mobility to overcome the disadvantageous fixed nature of a personal computer. However, mobile terminals are rather limited in memory and battery life, due to their compact size. Thus, users have difficulty in simultaneously implementing searching and playing contents or data by utilizing mobile terminals.

In order to overcome these difficulties, searching and playing processes need to be separated. For instance, users may select or search data with devices that have no limitation in a central processing unit, a memory and a battery, and view the selected or searched data with mobile terminals. Users also may select and search data with mobile terminals and view the selected or searched data with other devices.

However, in order to separately implement data searching and data playing, data should actively be shared among devices. Thus, data should be conveniently sharable by two or more devices so that the data can be implemented or processed in two or more devices. In addition, since the devices have different specifications and working environments from each other, data needs to be processed in consideration of the specifications and working environments of the devices. Therefore, a method to more conveniently share data is necessary.

SUMMARY OF THE INVENTION

Embodiments of the present invention are provided to overcome the above disadvantages in the prior art and other disadvantages not described above. According to the present invention, a method of transmitting data from a server through a network, is provided, which includes receiving and storing data from a first device, and transmitting the data, selected from the stored data based on second device information to a second device, if the second device connects to the network.

The storing includes storing data tables mapping devices using the data on the data, and the transmitting comprises transmitting the data mapped to the device, if the device recorded on the data tables is connected.

The transmitting includes selecting the data based on the second device information before the second device connects to the network, if the second device is preregistered on the server, and transmitting the selected data to the second device after the second device connects to the network.

The second device information includes records that the second device uses data.

The selected data is processed for the optimal implementation of the second device based on the second device information.

The transmitting includes receiving the second device information when the second device connects to the network, if the second device is unregistered on the server, selecting the data based on the received information and transmitting the data to the second device.

The second device information includes information of the second device authorization, and the transmitting comprises transmitting the data selected by comparing data transmission authorization that the selected data transmission requests with the second device authorization.

If the data transmission authorization has a level equal to or lower than the second device authorization, the transmitting includes transmitting the selected data, and if the data transmission authorization has higher level than that of the second device authorization, the transmitting includes transmitting requests of transmitting the selected data to the first device and transmitting the selected data based on a response received from the first device.

The data transmitted to the second device is updated on the first device or set by a user through the first device.

The transmitting includes receiving keywords inputted to the first device by user manipulation, selecting the second device based on the keywords, and transmitting the data to the second device.

The second device is terminal set by a user through the first device.

The transmitting includes receiving keywords inputted to the first device by user manipulation, selecting the second device based on the keywords, and transmitting the data to the second device.

The transmitting includes generating metadata of the selected data and transmitting the metadata with the selected data to the second device.

If the selected data or the metadata are transmitted, the second device displays at least one of the selected data or the metadata by automatically implementing an application to run the received data or to display the received metadata.

The transmitting includes transmitting the selected data to the second device after receiving a transmission request of the stored data from the first device, if the second device connects to the network.

The second device information includes device information and user information, wherein the device information includes at least one of information on manufacturers, products, Media Access Control (MAC) addresses, and profiles, and the user information includes at least one of information on access authorization to the server or the network, security, and user preferred data.

The data is at least one of photos, videos, voices, addresses, telephone numbers, searching results, and webpages stored in at least one of the user terminal devices.

The second device provides a user with a User Interface (UI) to determine whether the selected data is displayed, and implements an application to display the selected data according to user manipulation of the UI.

The storing includes integrating and storing data received from a plurality of first devices, if there are two or more first devices, and the transmitting comprises transmitting integratedly stored data to the second device, if the second device connects to the network.

According to the present invention, a method of transmitting data performed by a server through a network is provided. The method includes receiving and storing data from a device of a first user; detecting that a device of a second user accesses the server; selecting data from the stored data based on user information; processing the selected data to be optimized for the device of the second user; and transmitting the processed data to the device of the second user, wherein the server is configured to combine data received from a plurality of devices of the first user and transmit the combined data to the device of the second user.

According to the present invention, a method of transmitting data in an ad hoc network is provided. The method includes receiving and storing data from a device of a first user; detecting that a device of a second user accesses the ad hoc network; selecting data from the stored data based on user information; processing the selected data to be optimized for the device of the second user; and transmitting the processed data to the device of the second user, wherein a server is configured to combine data received from a plurality of devices of the first user and transmit the combined data to the device of the second user.

According to the present invention, a server is provided. The serer includes a communication interface configured to transmit and receive data to and from a device of a first user and a device of a second user through a network; a storage unit configured to store the data received from the device of the first user; and a control unit configured to detect that the device of the second user accesses the server, select data from the stored data based on user information, process the selected data to be optimized for the device of the second user, and transmit the processed data to the device of the second user, wherein the server is configured to combine data received from a plurality of devices of the first user and transmit the combined data to the device of the second user.

According to the present invention, a data transmitting system is provided. The data transmitting system includes a device of a first user configured to connect to a network and transmit stored data to a server, a device of a second user configured to connect to the network and receive data from the server, and a server configured to receive and store the data, detect that the device of the second user connects to the network, select data from the received and stored data based on user information, process the selected data to be optimized for the device of the second user, and transmit the processed data to the device of the second user, wherein the server is configured to combine data received from a plurality of devices of the first user and transmit the combined data to the device of the second user.

BRIEF DESCRIPTION OF THE DRAWINGS

The above and/or other aspects of the present invention will be more apparent by describing embodiments of the present invention with reference to the accompanying drawings, in which:

FIGS. 21 to 24 illustrate a content clipping process according to content types of the present invention.

DETAILED DESCRIPTION OF EMBODIMENTS OF THE INVENTION

Figure 1:
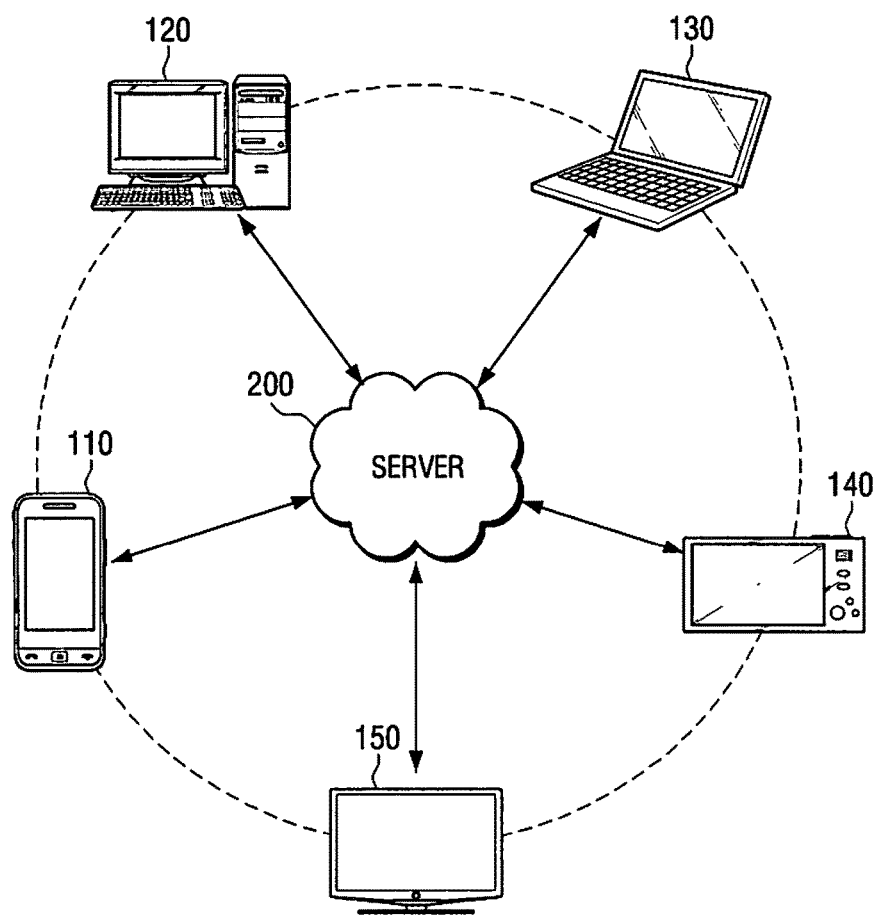
FIG. 1 illustrates a data transmitting system according to the present invention.

Embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the embodiments of the present invention can be carried out without those specifically defined matters. Also, well-known functions or constructions are not described in detail for the sake of clarity and conciseness.

FIG. 1 illustrates a data transmitting system according to the present invention. The data transmitting system selects data from a plurality of data according to user needs, and enables sharing of the selected data with other devices. Additionally, the system transmits the shared data to other connected devices, if the devices are connected to a server.

The data transmitting system may include user terminal apparatuses such as a cellular phone 110, a personal computer 100, a laptop computer 130, a digital camera 140, a television set 150, and a server 200.

The terminal apparatuses not only perform their own roles, but also transmit their own data to the server 200 in order to share the data with other devices.

For instance, the cellular phone 110 transmits webpages searched through web-surfing and stores the webpages in the sever 200, while the personal computer 100, which connects to the server 200, calls and displays the stored webpages. Likewise, the digital camera 140 takes photos, transmits the photo data to the server 200, and stores the data in the server 200, while the television set 150, one of the other devices connected to the server 200, calls and displays the stored photos.

The shared data may include all of the data generated or transmitted by the connected devices such as videos, voices, addresses, telephone numbers, and internet-searching data as well as the aforementioned photos and webpages.

As explained above, the server 200 stores the shared data transmitted from the devices through a network, and transmits the data to the devices connected to the server through the network.

The server 200 analyzes information related to the devices connected to the server 200, and determines device access based on information analysis.

The information related to the devices may include user information as well as device information.

The device information may include information on manufacturers, products, MAC addresses, and profiles, as well as other information. The user information may include, for example, information on access authorization to the server 200, security, and user preferred data.

The information on manufacturers is identification information related to the companies that manufactured the device, and the information on products is identification information on the device types. In addition, the MAC address information is a unique identification information determined for each communicable device, and the information on profiles is a collective term for the information on certification and levy regarding the device, the services used by the device, and the communication network to which the device belongs.

The access authorization information reveals the device having an access authorization to the network or to the server while the security information reveals the status of the device security. Additionally, the user preferred data information reveals the data that a device user prefers.

For instance, the server 200 may allow a device to access the server 200 without particular control, if the server 200 finds that all of the connected devices are produced by one manufacturer, or that a user of the connected devices have an authorization to the server 200, based on the device information of the devices connected to the server 200.

Additionally, the server 200 may previously find and store user preferred data through the television set 150, and transmit the data related to the preferred information from the shared data to the television set 150. For example, the user preferred data may be generated based on watching lists of the television set 150, or data lists transmitted by accessing to the server 200 through the television set 150.

The server 200 may check the updated shared data, and provide the shared data to a device when the device connects to the server 200. The shared data is provided when the device connects to the server 200, since connecting to the server 200 may indicate that a user wants to use the connected device. Thus, the server 200 may find that a user wants to use the device when the device connects to the server 200, and transmit the shared data to the device. Transmitting process after accessing the server 200 will be further explained below.

The server 200 may provide the shared data to the device accessing the server 200 based on the device information and the user information as explained above. In order to more efficiently transmit and receive the shared data, each device needs to be registered on the server 200. The shared data may also be provided without registering a device on the server 200. However, if the server provides the shared data to the registered device, the authorization process may be implemented in a simpler manner and the data transmitting and receiving process is customized for the registered device.

The process of registering devices on the server 200 will be described below with reference to FIG. 2.

Figure 2:
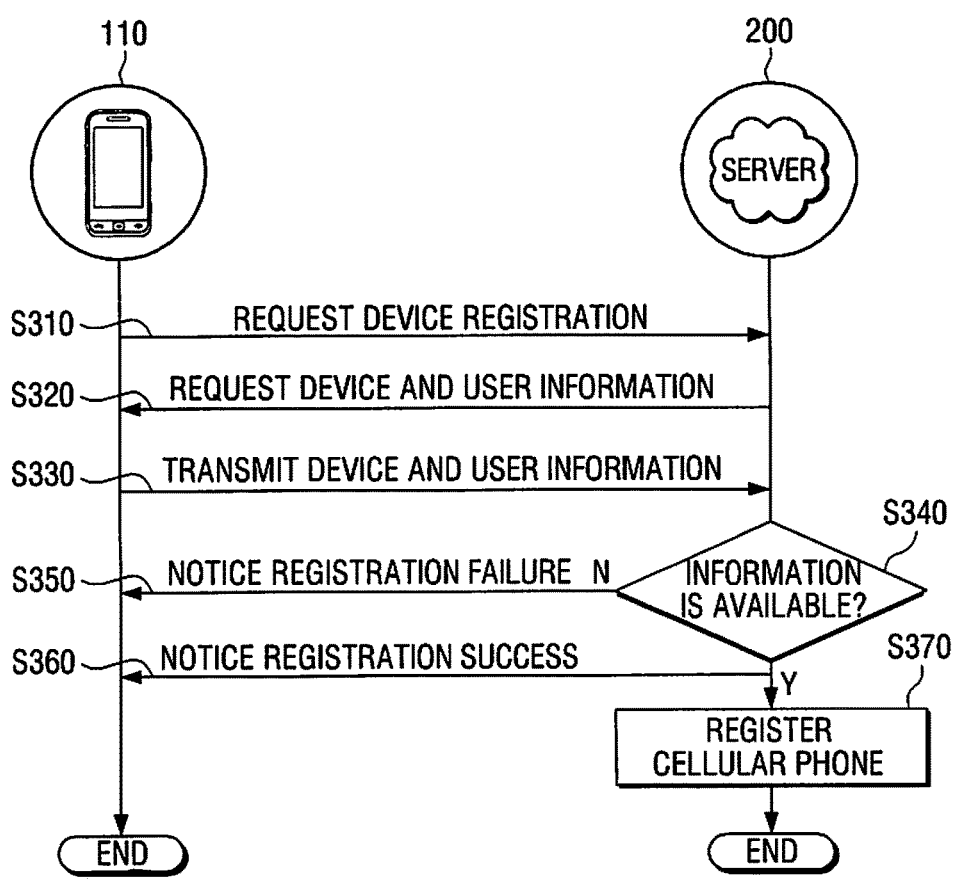
FIG. 2 illustrates registering a device according to the present invention.

FIG. 2 illustrates a process of registering device according to the present invention. For example, the cellular phone 110 is registered on the server 200 in FIG. 2.

In order to register the cellular phone 110 on the server 200, at S310, the cellular phone 110 transmits a device registering request to the server 200. At S320, the server 200 receives the device registering request of the cellular phone 110, and transmits device and user information request to the cellular phone 110 in order to determine the possibility of the device registration. At S330, the cellular phone transmits the device and user information to the server 200 in response to the device and user information request.

As explained above, the device information of the cellular phone 110 may include, for example, information on manufacturers, products, MAC addresses, and profiles. Additionally, the user information of the cellular phone 110 may include, for example, information on access authorization to the server 200, security, and user preferred data.

At S340, based on the device and user information received from the cellular phone 110, the server 200 determines whether the cellular phone 100 can be registered, or in other words, whether the received information is available to register the cellular phone 110.

At S340—N, if the registration fails, at S350, the server 200 notifies registration failure to the cellular phone 110, and at S340—Y, if the registration succeeds, at S360, the server 200 notifies registration success to the cellular phone 110. At S370, the server 200 registers the cellular phone 110 on the server 200 and stores information received from the cellular phone 110.

Registering the cellular phone 110 on the server 200 simplifies the authorization process of the cellular phone 110, and thus, a process of transmitting the shared data generated by the cellular phone 110 or received from other devices to the server 200 is expedited. Additionally, registering the cellular phone 110 on the server 200 may enable customization of the cellular phone 110, or in other words, the server 200 may provide the shared data optimized for the cellular phone 110 if the data is transmitted to the cellular phone 110.

Figure 3:
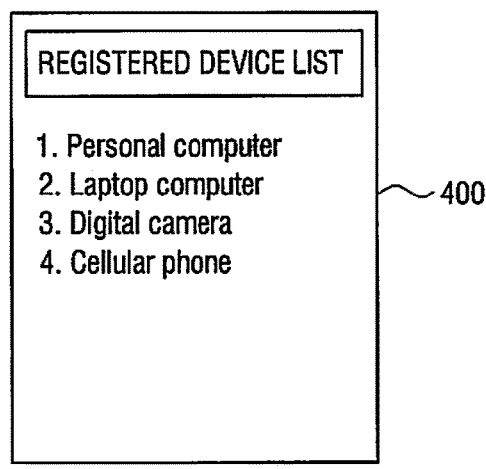
FIG. 3 illustrates a list of devices registered on a server.

FIG. 3 illustrates a list of devices registered on the server 200.

The server 200 arranges registered device list 400, and transmits and receives the shared data more conveniently if the device of the registered device list 400 is connected.

Although FIG. 3 shows product names of the registered device list 400, the server 200 may also store device and user information received from the devices in the registered device list 400.

Figure 4:
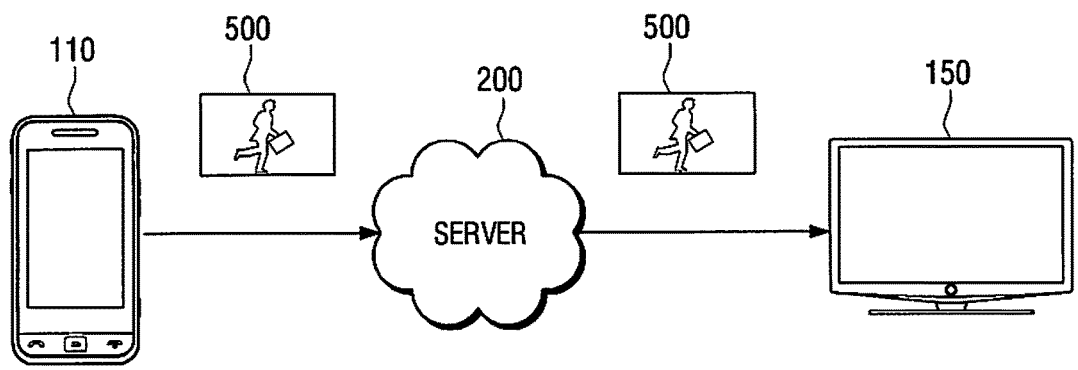
FIG. 4 illustrates a process of transmitting shared data according to the present invention.

FIG. 4 illustrates a process of transmitting the shared data according to the present invention. The cellular phone 110 and the television set 150 will be explained as an example.

The cellular phone 110 transmits the data 500 generated by the cellular phone 110 or received from other devices to the server 200 to share the data 500 with other devices.

Transmitting the data from the cellular phone 110 to the server 200 results in the following effects.

The data 500 can be visually provided more conveniently. It is inefficient for plural viewers to view the data 500 with the cellular phone 110 due to a limited display size. Thus, if a user needs to share the data stored on the cellular phone 110 with other users, he or she can store the data 500 in the server 200 and call the data through a device having a larger display, such as the television set 150.

The data 500 can be separately collected and processed more conveniently. The cellular phone 110 is portable and can be used without limitation of place and time. However, it has limited display size and is inconvenient in terms of user manipulation. The user can easily collect data through the cellular phone 110, store the data in the server 200, and process the stored data of the server 200 through the personal computer 100 at home. If a viewer cannot use the television set 150 due to a lack of time, he or she may store the data of the television set 150 in the server 200, and call and watch the data through the cellular phone 110.

The data 500 can also be arranged more conveniently. Each device may have common data despite limited storage. The server 200 can integrate every common data from all of the connected devices, enabling a user to conveniently arrange the data 500.

The server 200 transmits and stores the data 500 generated by the cellular phone 110 or received from other devices. The server 200 transmits the stored data 500 to the television set 150 if the data 500 is called by the television set 150.

As explained above, if the device is registered on the server 200, transmitting and receiving data becomes more efficient.

Figure 5:
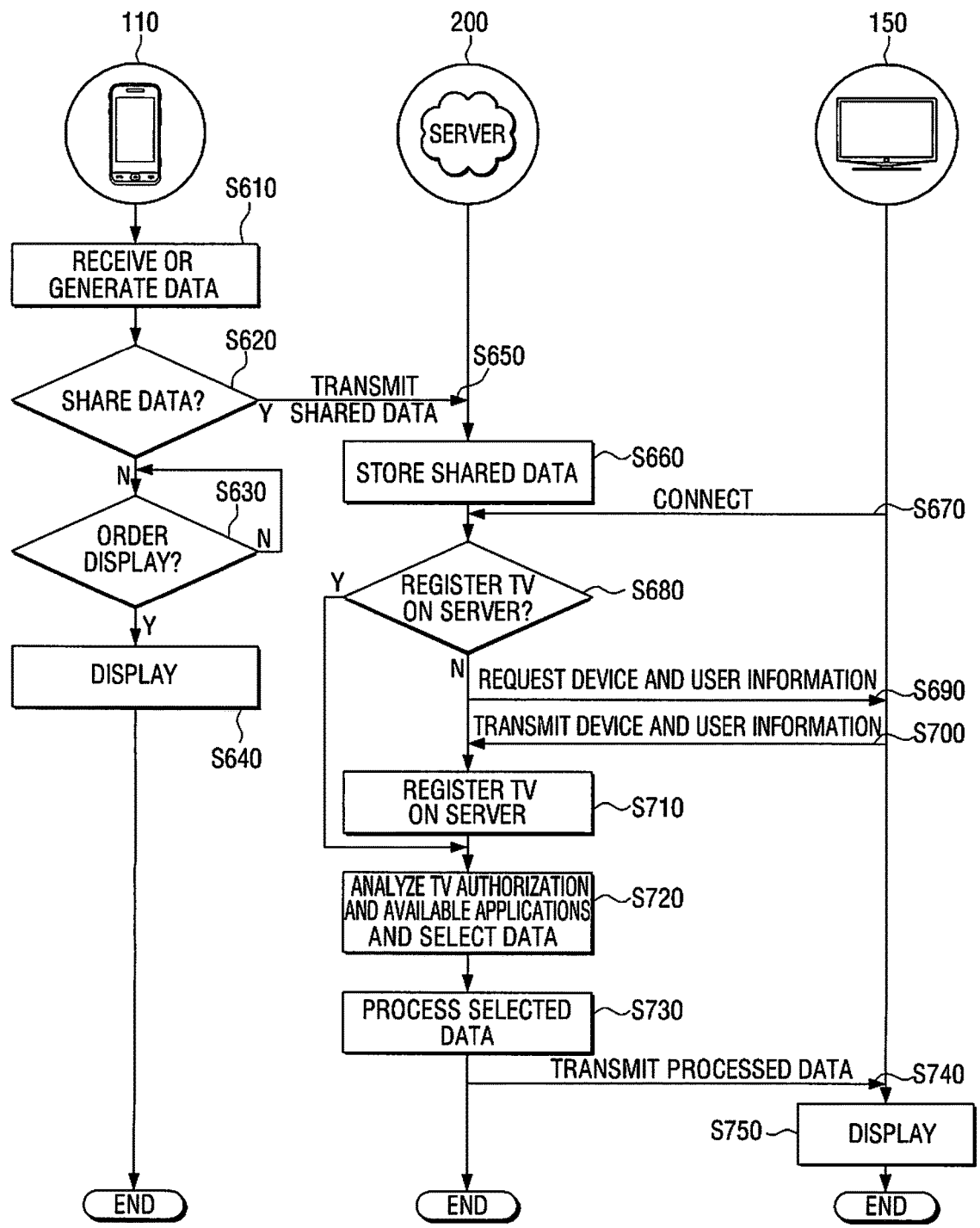
FIG. 5 illustrates a process of transmitting the shared data according to a registration status according to the present invention.

FIG. 5 illustrates a process of a process of transmitting the shared data according to a registration status according to the present invention.

The cellular phone 110 receives or generates data at S610, and determines if the data is shared at S620. If the data is determined to be unshared at S620—N, the cellular phone find if the data display command is inserted at S630. If the display command is inserted at S630—Y, the cellular phone displays the command at S640.

If the data is determined to be shared at S620—Y, the cellular phone 110 transmits the shared data to the server 200 at S650.

The server 200 stores the shared data from the cellular phone 110 as updated data at S660. If the television set 150 connects to the server at S670, the server determines if the television set 150 is preregistered on the server 200 at S680.

If the television set 150 is unregistered on the server 200 at S680—N, the server 200 transmits a device and user information request to the television set 150, and the television set 150 transmits the device and user information to the server 200 in response to the request at S700.

The server 200 registers the television set 150 on the server 200 at S710. The above explanation shows a brief registering process, but the process may further include additional processes such as those shown in FIG. 2.

If the television set 150 is registered on the server 200 as S710, or the television set 150 is preregistered on the server 200 at S680—Y, the server 200 selects data by analyzing authorization and available applications of the television set 150 based on the stored device and user information received or pre-received from the television set 150 at S720.

Authorization of the television set 150 is analyzed since sharing limitation may be set by the cellular phone 150 providing the shared data.

Applications of the television set 150 are analyzed since all of the data may not be available in every device. Thus, the server 200 previously finds available data types that can be implemented on the television set 150 based on the device and user information, and transmits the available data to the television set 150.

Additionally, the server 200 processes the selected data based on the device and user information received or previously received from the television set 150 at S730. Processing data may include, for example, scaling data, optimizing data to the resolution of the television set 150, and arranging data size to implement on the television set 150.

The server 200 transmits the processed data to the television set 150 at S740. The television set 150 displays the data upon receiving at S750.

The television set 150 receives and displays the updated shared data upon connected to the server 200, enabling a viewer to watch the updated shared data without delay.

As explained above, the server 200 may automatically transmit the updated data of the server 200 to the devices upon connected to the server 200. According to the foregoing embodiment, the television set 150 may not provide a user with data unavailable on the television set 150 since the unavailable data are not transmitted to the television set 150. Thus, the server 200 determines whether other devices can implement the non-transmitted data upon connection to the server 200, and transmits the data to the newly connected device if the data are available on the device.

Figure 6:
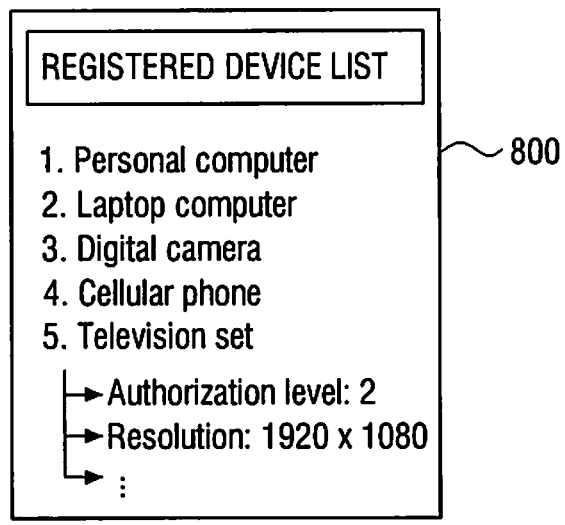
FIG. 6 illustrates a list of devices registered on the server.

FIG. 6 illustrates a list of devices registered 800 on the server 200. As explained above, since the server 200 arranges the registered device list 800, the server 200 transmits and receives the shared data more conveniently if a device included in the registered device list 800 connects to the server 200.

Particularly, as shown in FIG. 6, the server 200 detects specific information such as authorization level or resolution of the devices based on the device and user information, and manages the detected information with the registered device list 800, which can be applied to analyzing device authorization and available applications of the devices, and to processing data.

Figure 7:
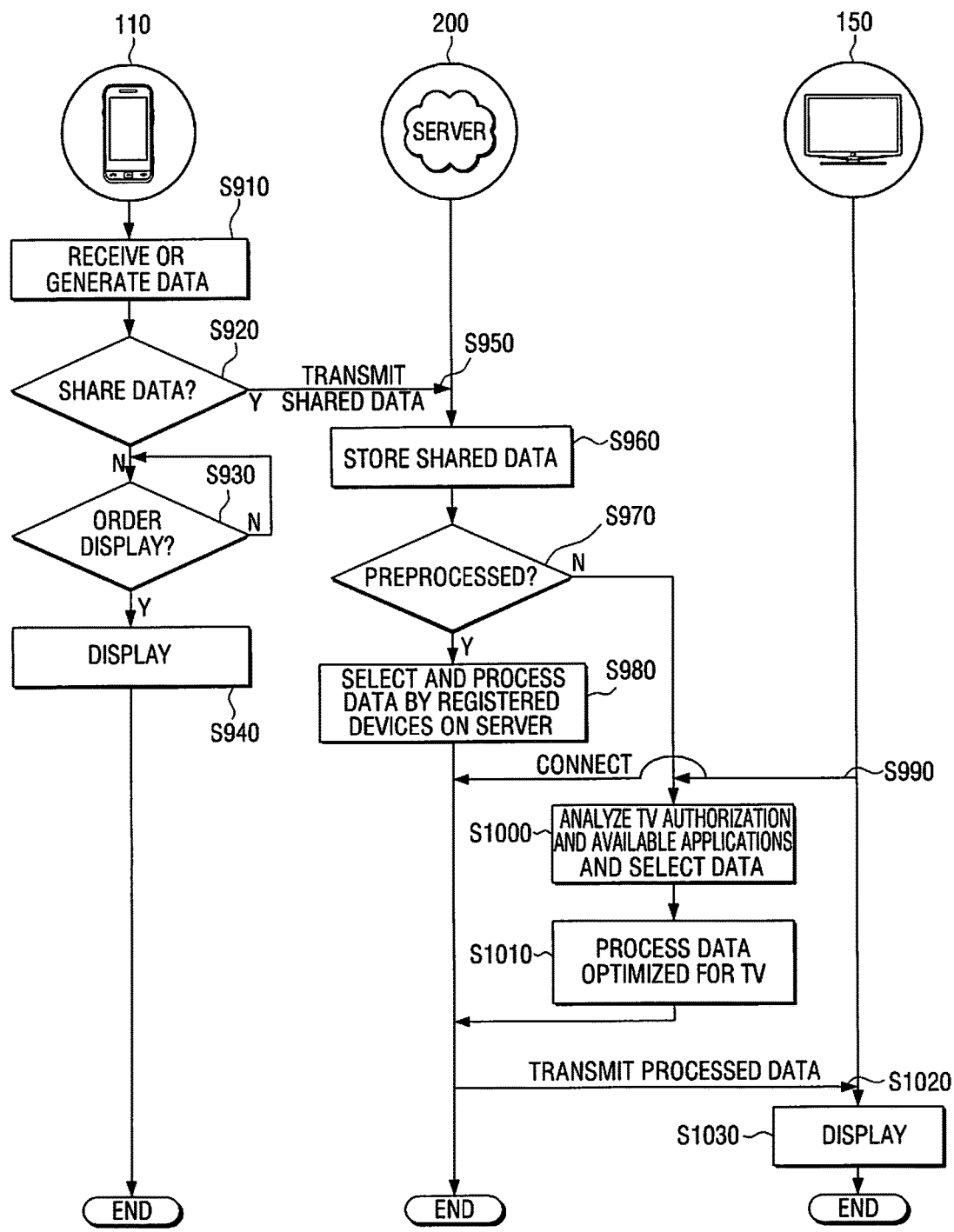
FIG. 7 illustrates a process of transmitting the shared data according to a preprocessing status according to the present invention.

FIG. 7 illustrates a process of transmitting the shared data according to a preprocessing status according to the present invention.

At S910, The cellular phone 100 receives or generates data, and at S920, determines if the data is shared. At S920—N, if the data is determined to be unshared, at S930, the cellular phone 110 finds if the data display command is inputted. If the command is inputted at S930—Y, the cellular phone 110 displays the command at S940.

Meanwhile, if the data is determined to be shared at S920—Y, the cellular phone transmits the data to the server 200 at S950.

The server 200 stores the shared data received from the cellular phone 110 and set the data as updated at S960. The sever 200 determines a pre-processing status of the updated shared data before a device connects to the server 200 at S970.

Preprocessing status of data may be determined according to setting input from a user.

If the data is determined to be pre-processed at S970—Y, the server 200 processes the updated shared data according to the registered device information. For instance, the server 200 may register the cellular phone 110, the personal computer 100, the laptop computer 130, the digital camera 140, and the television set 150. The server 200 may process the updated shared data to be optimized for the cellular phone 110 based on the device and user information received from the cellular phone 110, the server 200 may process the updated shared data to be optimized for the personal computer 100 based on the device and user information data received from the personal computer 100, the server 200 may process the updated shared data to be optimized for the laptop computer 130 based on the device and user information received from the laptop computer 130, the server 200 may process the updated shared data to be optimized for the digital camera 140 based on the device and user information received from the digital camera 140, and the server 200 may process the updated shared data to be optimized for the television set 150 based on the device and user information received from the television set 150.

Additionally, if the data is determined to be preprocessed at S970—Y, the server 200 selectively processes the updated shared data according to registered devices. For instance, if the data is unavailable on the television set 150, the server 200 may not process the updated shared data so as to transmit the data to the television set 150.

After completing processing the updated shared data, the server 200 stores and arranges the processed data until devices connect to the server 200.

If the television set 150 connects to the server 200 at S990, The server 200 transmits the processed data optimized for the television set 150 to the television set 150 at S1020, and the television set 150 displays the received data on a screen at S1030.

Figure 8:
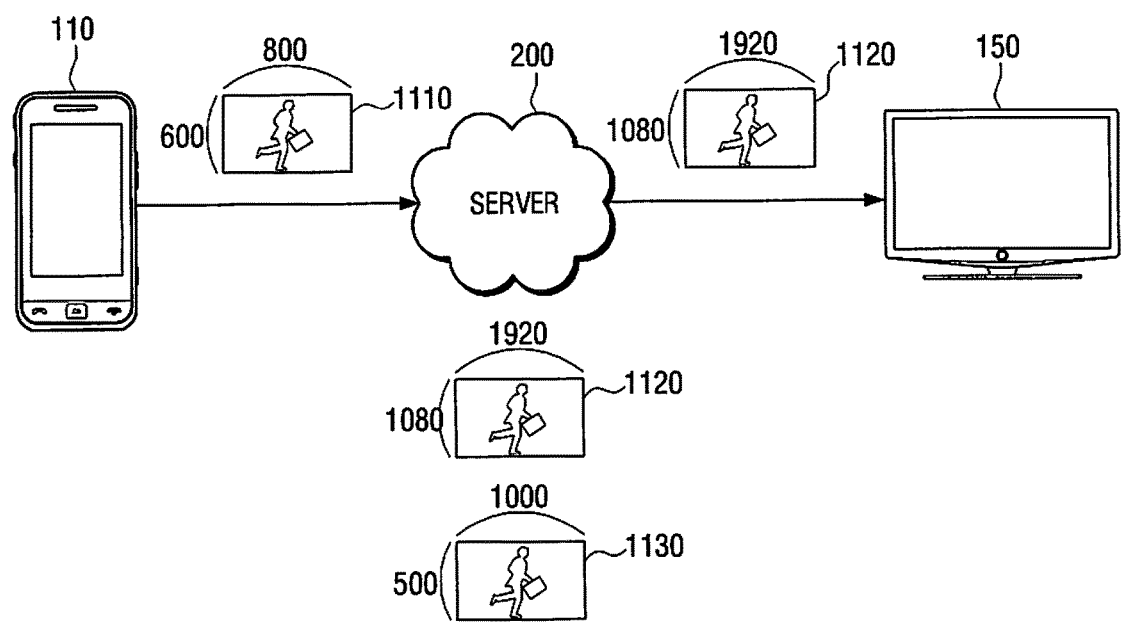
FIG. 8 illustrates the shared data processed according to the devices according to the present invention.

FIG. 8 illustrates the shared data processed according to devices.

Referring to FIG. 8, the cellular phone 110 takes a photo and transmits the photo data 1110 to the server 200 to share the data with other devices. The photo data has a resolution of 800*600.

The server 200 processes the received shared data based on the device and user information received from devices. If the digital camera 140 having a resolution of 1000*500 and the television set 150 having a resolution of 1920*1080 are registered on the server 200, the server scales and converts the shared data to the data having a resolution of 1000*500 based on the device and user information of the digital camera 140 while the server scales and converts the shared data to the data having a resolution of 1920*1080 based on the device and user information of the television set 150.

If the television set 150 connects to the server 200, the server 200 transmits the processed data having a resolution of 1920*1080 to the television set 150.

Converting resolution is one of several embodiments of what is disclosed herein. Converting for the optimized implementation of data in devices such as converting file formats, converting file size may also be included.

If the data is determined to be non-preprocessed at S970—N, the server 200 stores the data without processing the updated shared data and arranges the data until devices connect to the server 200.

If the television set 150 connects to the server 200 at S990, the server 200 analyzes authorization and available applications of the television set 150 based on the device and user information received from the television set 150, selects the shared data available on the television set 150 at S1000, and processes the selected data to be optimized for the television set 150 at S1010.

The server 200 transmits the optimized data to the television set 150 at S1020, and the television set 150 displays the data at S1030.

A user may select preprocessing or on-preprocessing for the updated shared data. The server 200 more quickly transmits the devices upon being connected to the server 200 while the server 200 uses a large amount of storage capacity since the server 200 stores the processed data in each device.

Figure 9:
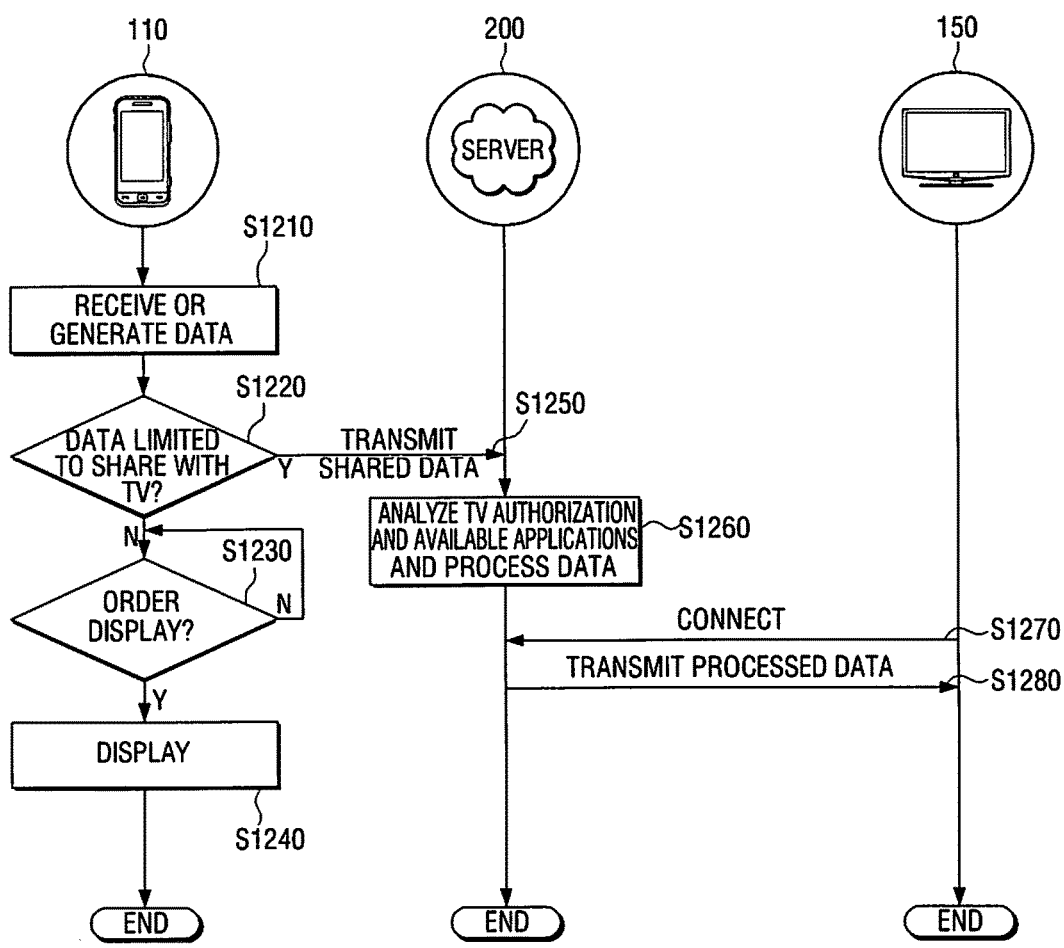
FIG. 9 illustrates a process of transmitting the shared data according to the present invention.

FIG. 9 illustrates a process of transmitting the shared data according to the present invention.

The cellular phone 110 receives or generates data at S1210, and determines if the data is shared only with the television set 150 at S1220. If the data is shared with other devices than the television set at S1220—N, the cellular phone 110 finds if the data display command is inputted at S1230. If the display command is inputted at S1230—Y, the cellular phone displays the command at S1240. A process to set the data to be shared with other registered devices on the server 200 than the television set 150 may also be added.

If the data is shared only with the television set 150 at S1220—Y, the cellular phone 110 transmits the data, which are limitedly shared with the television set 150, to the server 200 at S1250.

The server 200 stores the data received from the cellular phone 110, and sets the data as updated and as shared only with the television set 150 at S1260.

The server 200 analyzes authorization and available applications of the television set 150 based on the device and user information received from the television set 150 and processes the data to be optimized for the television set 150 at S1260.

If the television set 150 connects to the server 200 at S1270, the server 200 transmits the preprocessed data to the television set 150. Since the processed data is only shared with the television set 150, the server 200 does not transmit the data to other devices even if the devices connect to the server 200.

Figure 10:
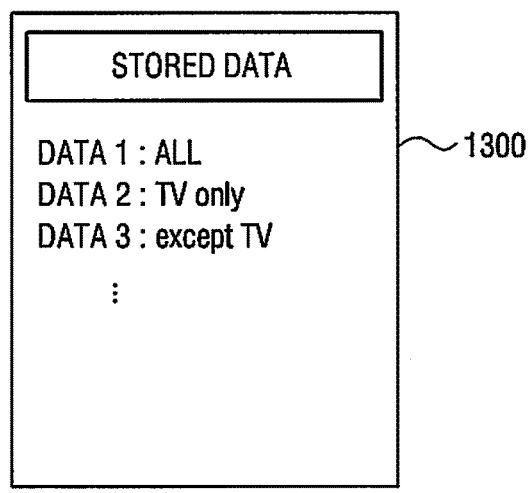
FIG. 10 illustrates data stored on the server.

FIG. 10 illustrates data 1300 stored on the server 200 according to the present invention.

As explained above, the server 200 stores the data updated and transmitted from devices registered on the server 200. Data transmitted from devices and shared with other devices may also be stored on the server 200.

Meanwhile, the server 200 stores data with information on data sharing limitation. For instance, DATA 1 is shared with all of the devices while DATA 2 is shared only with the television set 150, and DATA 3 is shared with devices excluding the television set 150.

Thus, data can be shared according to user manipulation, resulting in protecting user privacy.

Meanwhile, the server 200 stores data based on metadata. The server 200 generates metadata from the received shared data, and stores the metadata with the corresponding shared data. Thus, each device may input a specific keyword, and search and select data to be transmitted to the other devices.

Figure 11:
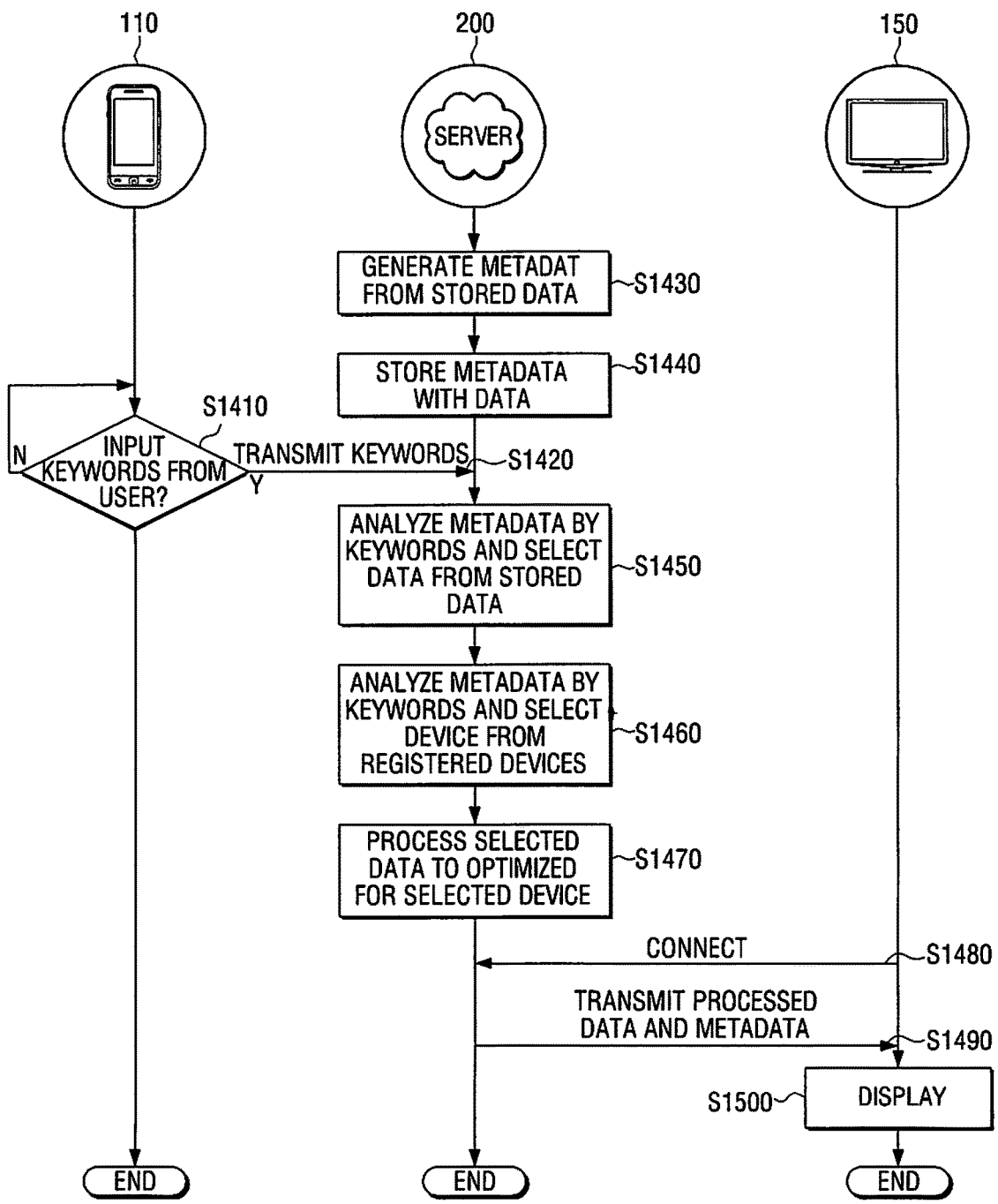
FIG. 11 illustrates a process of providing the shared data based on the metadata according to the present invention.

FIG. 11 illustrates a process of providing the shared data based on the metadata according to the present invention. The server 200 stores the shared data from devices and generates metadata from the shared data at S1430. The server 200 stores the metadata with the corresponding shared data at S1440.

Figure 12:
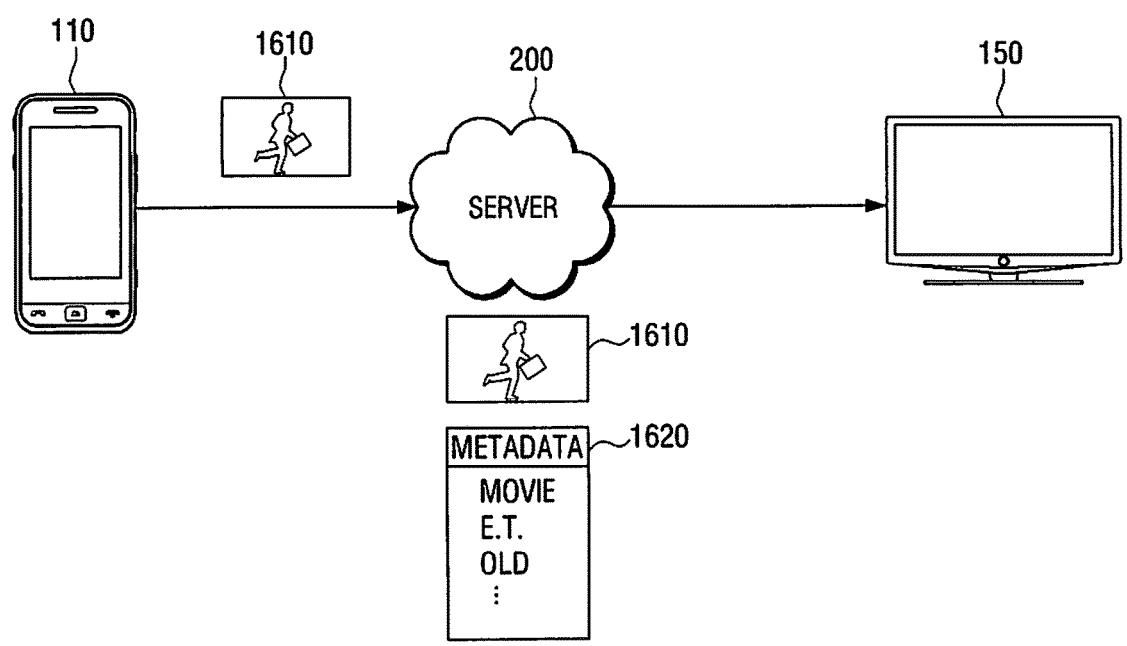
FIG. 12 illustrates a process of generating metadata according to the present invention.

FIG. 12 illustrates a process of generating metadata according to the present invention.

Referring to FIG. 12, if the cellular phone 110 transmits the shared data 1610 to the server 200, the server 200 stores the received shared data 1610, generates the metadata 1620 from the shared data 1610 and stores both the shared data and metadata.

For instance, in FIG. 12, metadata MOVIE is generated from the received shared data based on genre information; metadata E.T. based on title information; and metadata OLD based on date information.

Any other information generated from the shared data 1610 than genre, title and date may be metadata. Thus, symbol, number, figure or color constituting the data, or domain names of webpages including or searching data may generate the metadata.

Thus, as explained above, each device may select and search the data to be transmitted to the other devices by inputting keywords.

In FIG. 11, if a user input a keyword to the cellular phone 110 at S1410, the cellular phone 110 transmits the keyword to the server 200 at S1420, the server 200 analyzes the metadata of the shared data stored on the server 200 based on the keyword, and selects the shared data corresponding to the metadata at S1450.

Additionally, the server 200 select some of the registered devices by analyzing metadata based on the keyword at S1460, and processes and stores the selected data in an optimized format for the selected devices at S1470.

The server 200 determines whether other devices connect to the server 200. If the television set 150 connects to the server 200 at S1480, the server 200 transmits the processed data with the metadata to the television set 150 at S1490, and the television set 150 displays the processed data on the screen at S1500. The server 200 may also transmit the processed data to the television set excluding the metadata.

Figure 13:
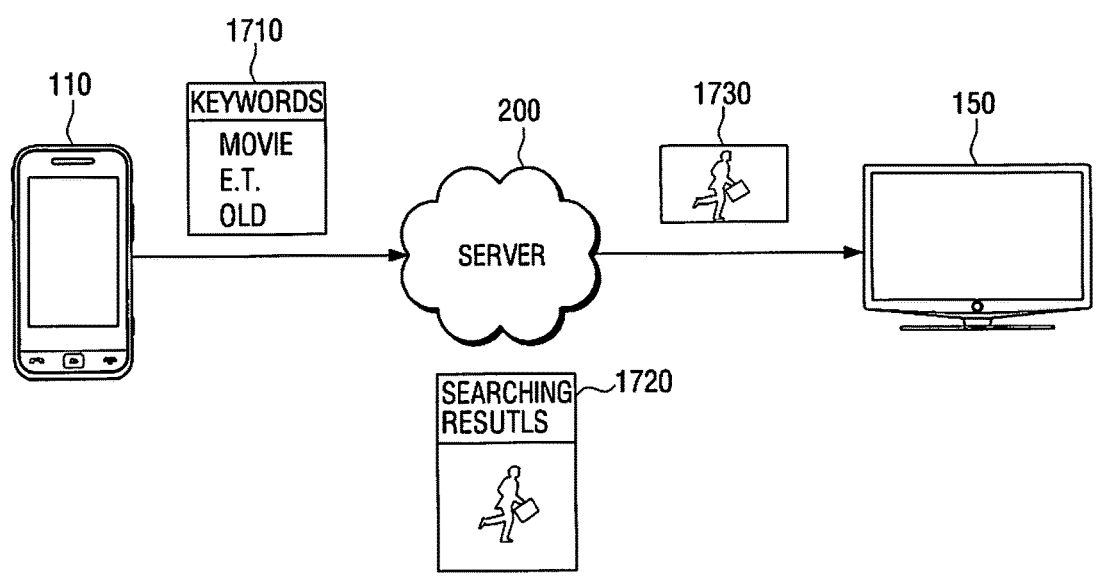
FIG. 13 illustrates searching the shared data based on keywords and transmitting the shared data according to the present invention.

FIG. 13 illustrates transmitting the shared data based on keywords according to the present invention.

If a user inputs the keywords 1710 such as MOVIE, E.T., and OLD to the cellular phone 110 and transmits the keywords 1710 to the server 200, the server 200 searches the shared data based on the keywords 1710 and generates the searched data 1720.

Additionally, if the cellular phone 110 has a command of transmitting the searched data, the server 200 finds devices connected to the server 200, and transmits the shared data 1730, or in other words, transmits the searched data 1720, to the television set 150 connected to the server 200.

As explained above, the shared data generated or received by the cellular phone 110 is stored on the server 200, and the server 200 transmits the shared data to the television set 150 upon connecting.

Since a user begins to use devices upon getting connected to the server 200, the server 200 transmits the shared data to devices when the device is connected to the server 200. Transmitting the updated data to a device upon connecting to the server 200 enables a user to conveniently find the updated data without having to input any other manipulation.

Since home devices can be used by plural users, a user of the cellular phone 110 can be different from a user of the television set 150. It often occurs that a viewer of the television set 150 connected to the server 200 is different from a user who is finding updated data through the television set 150.

Checking the updated data may inconveniently disturb the viewer who wants to watch the television set 150 only.

In order to solve this inconvenience, a user may be required to choose whether to display the received updated data.

Figure 14:
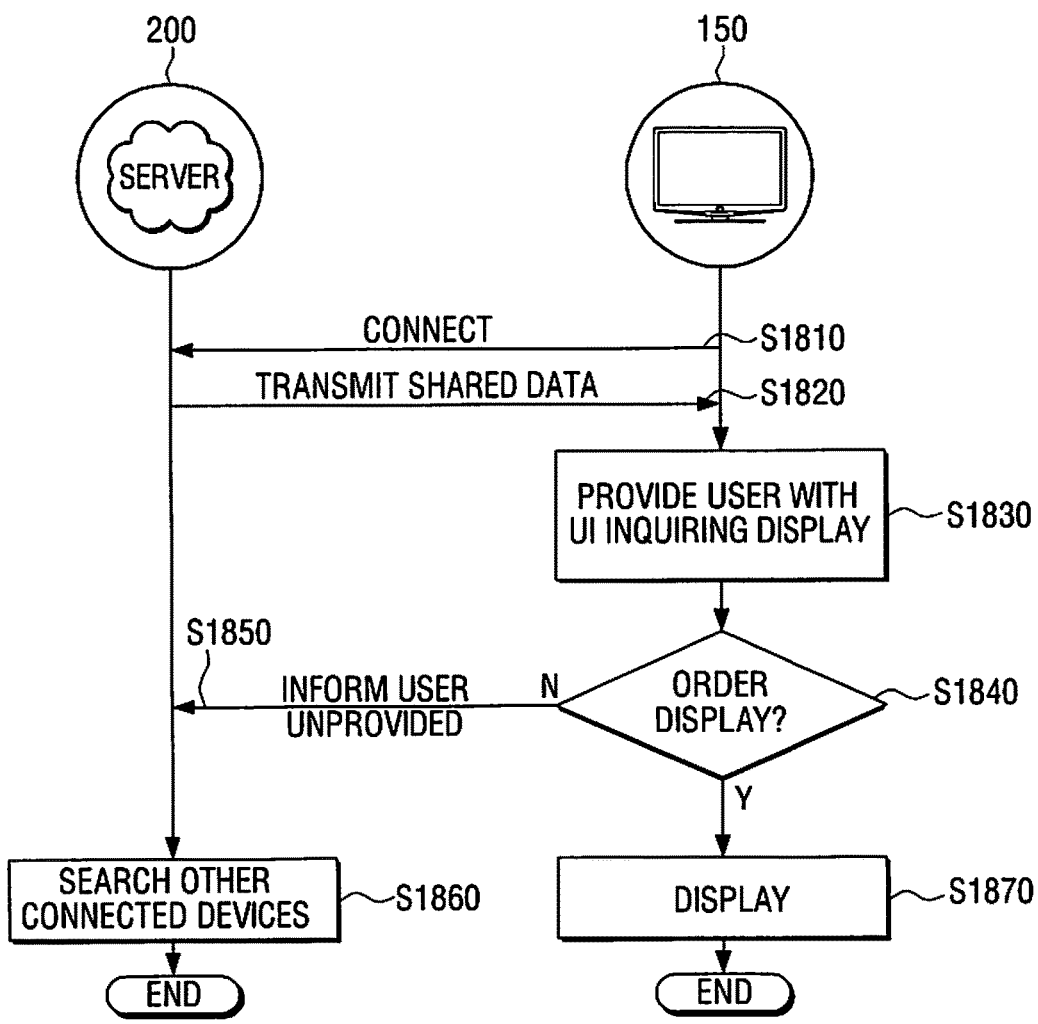
FIG. 14 illustrates a process of providing a user interface (UI) to display the shared data according to the present invention.

FIG. 14 illustrates providing of a user interface (UI) to display the shared data according to the present invention.

Referring to FIG. 14, when the television set 150 connects to the server 200 at S1810, the server 200 transmits the shared data to the television set 150 at S1820.

Since a user storing the shared data in the server 200 may be different from a user manipulating the television set 150, the television set provides the UI to inquire if the television set 150 displays the shared data at S1830.

If a user inputs display command at S1840—Y, the television set 150 displays the shared data at S1870. If a user does not input display command at S1840—N, the television set 150 informs the server 200 that the shared data are unprovided at S1850. The television set 150 may also store the shared data in the television set 150, or may delete the shared data in the television set 150.

Since the shared data are not provided with the user, the server 200 detects other devices at S1860, and transmits the shared data to the connected devices.

Figure 15:
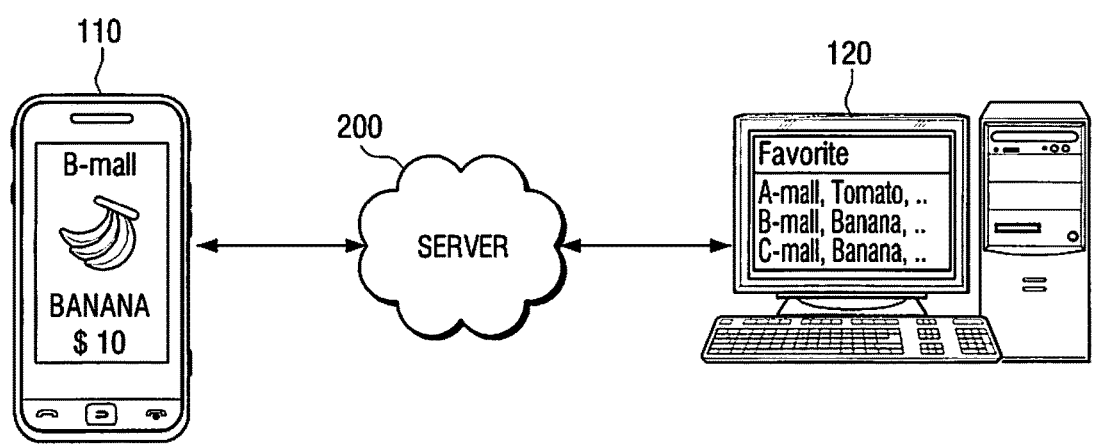
FIG. 15 illustrates display of metadata transmitted with the shared data according to the present invention.

FIG. 15 illustrates a process of displaying the metadata corresponding to the shared data according to the present invention.

In FIG. 15, a user searches a plurality of online shopping malls through the cellular phone 110, generating plural data, and transmits the plural data to the server 200 for sharing. The cellular phone 110 displays one of plural data that a user searches.

If the user sets the plural data as shared data, the data are transmitted and stored in the server 200.

The server 200 generates metadata corresponding to the shared data and stored both of them. In FIG. 15, a user searches a Banana costing $10.00 in a online shopping mall, B-Mall, and a server 200 stores a searched webpages as shared data.

The server 200 generates metadata such as B-Mall or Banana from the searched webpages.

Additionally, the server 200 generates metadata from searched webpages of a A-Mall and a C-Mall and stores the shared data with the metadata.

If the user connects to the server 200 with the personal computer 100, the server 200 transmits the updated shared data to the personal computer 100. If the server 200 finds that the capacity of the data received from the cellular phone 110 is high or that the data received from the cellular phone 110 have interrelationship to each other, the server 200 transmits the metadata to the personal computer 100 without the data.

The personal computer 100 displays the metadata corresponding to the updated shared data on one screen, enabling a user to select and download the shared data through the personal computer 100.

For instance, if a user needs to download the searched data of the B-Mall from the shared data, the user can select metadata indicating B-Mall on a screen. If a user selects one of the metadata indicating B-Mall, the server 200 provides the personal computer 100 with the shared data searching the B-Mall.

As a result, the personal computer 100 displays the same contents searched by the cellular phone 110.

Thus, a user can conveniently select data while carrying with the cellular phone 110 and utilize the data easier and faster while using the personal computer in a convenient environment since the personal computer 100 receives the shared data from the server 200 that the cellular phone 110 generates.

Particularly, according to the embodiment, the cellular phone 110 stores webpage data to pay goods as shared, and the personal computer 100 immediately connects the paying webpages. A user can previously select the goods when in having difficulties buying online, and can immediately purchase the goods by using a bookmark or a shopping list.

Although the above explains that the data that one device selects and searches are shared and displayed by other devices, the data that two or more devices transmits can also be integrated and implemented by other devices, which will be explained below with reference to FIG. 16.

Figure 16:
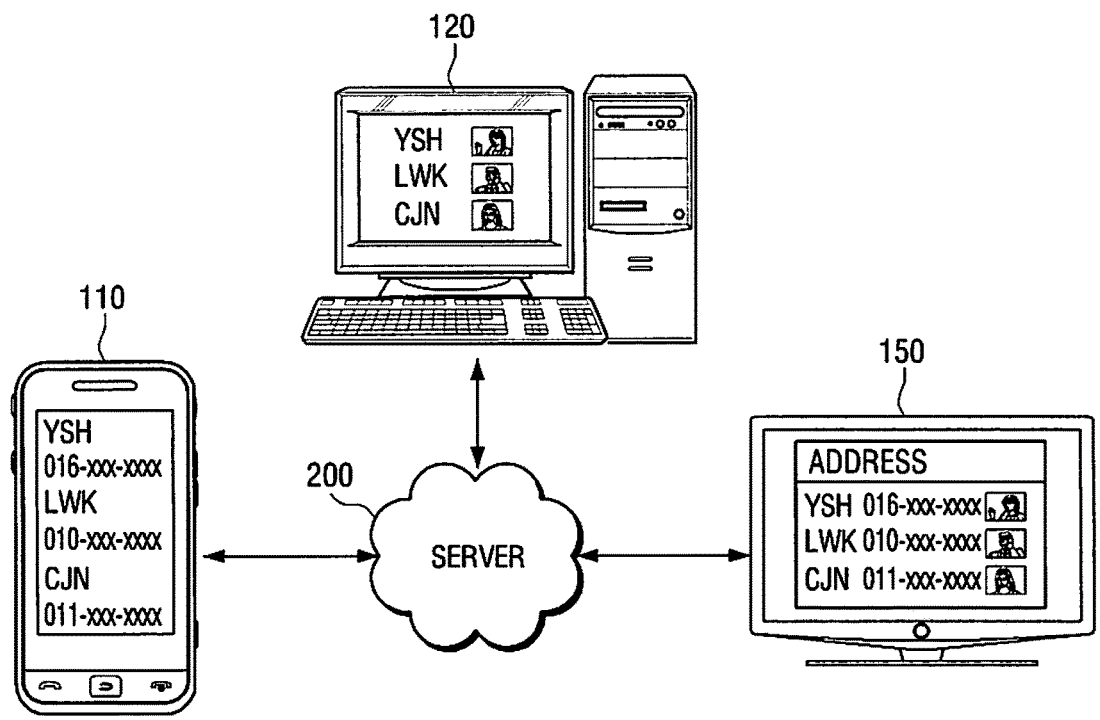
FIG. 16 illustrates a process of integratedly providing the shared data according to the present invention.

FIG. 16 illustrates integrally providing the shared data from two or more devices according to the present invention.

The server 200 stores the data that registered devices transmits for sharing.

For instance, referring to FIG. 16, if the personal computer 100 stores photo and name data, the server 200 receives and stores the photo and name data from the personal computer 100 for sharing. Additionally, if the cellular phone 110 stores telephone and name data, the server 200 receives and stores the telephone and name data from the cellular phone 110 for sharing.

The server 200 according to the embodiment integrally stores data from two or more devices. For instance, referring to FIG. 16, since the personal computer 100 transmits photo and name data while the cellular phone 110 transmits telephone and name data, the server 200 integrates the common data, in this case the name data from both the personal computer 100 and the cellular phone 110.

If a device connects to the server 200, the server 200 transmits the integrated data to the newly connected device. For instance, referring to FIG. 16, the television set 150 connects to the server 200, the sever 200 transmits address data integrating photo, telephone and name data to the television set 150.

If the television set 150 receives the address data from the server 200, the television set automatically implements application to find the address data, and displays the address data.

The server 200 stores and integrates common data of the shared data, enabling a user to use the common data by utilizing any one of the devices connecting to the server 200.

The above, explaining that the data generated by one of user devices are transmitted to the server 200 and shared by other devices, is one of several embodiments of what is disclosed herein. The server 200 may stores data generated by devices of other users, which will be explained below with reference to FIG. 17.

Figure 17:
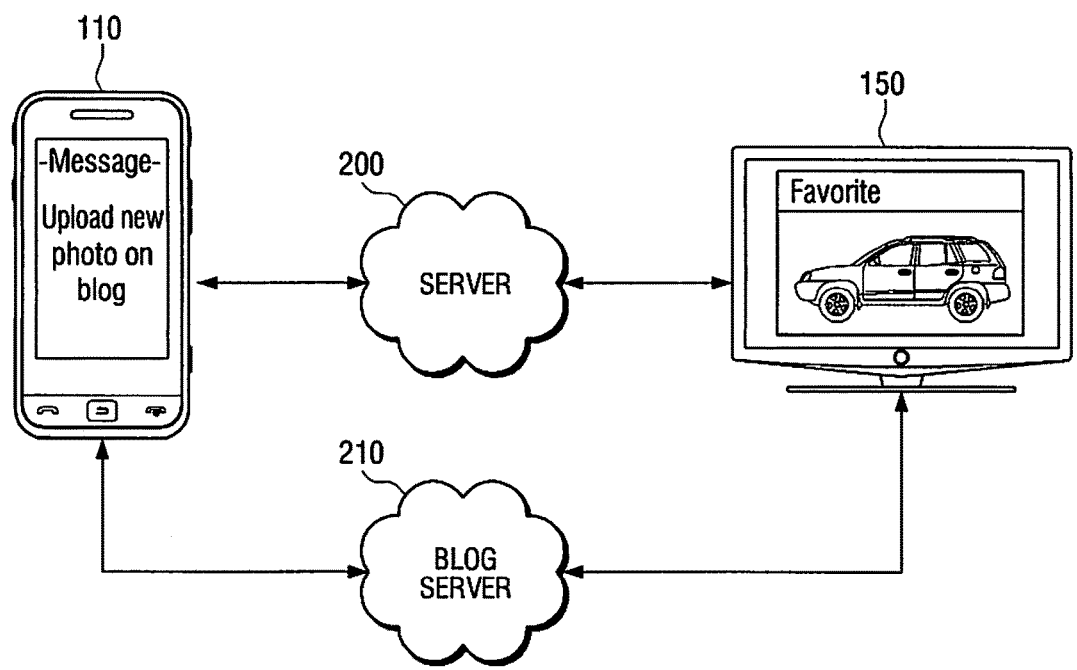
FIG. 17 illustrates a process of setting data generated by other users as shared data according to the present invention.

FIG. 17 illustrates a process of setting data generated by devices of other users as shared according to the present invention.

Since the above explains the implementation of the cellular phone 110, the server 200 and the television set 150, the blog server 210 will be explained below.

The blog server 210 stores contents such as videos, voices, and texts uploaded on a blog. Additionally, if new contents are uploaded on a blog, the blog server 210 informs blog users of the new contents by transmitting a newly uploaded message to the cellular phone 110.

The blog users may include blog members as well as blog owners. Thus, if new contents are uploaded on blogs that a user owns or joins, the user can be provided with a newly uploaded content message.

The cellular phone 110 receives the newly uploaded content message from the blog server 210. If the message is transmitted, the cellular phone can find a webpage or a new Internet address to call contents uploaded on a blog.

The cellular phone 110 may transmit the webpage to call the new blog contents to the server 200 for sharing. The server 200 stores the webpage as shared. If the television set 150 connects to the server 200, the server 200 transmits the webpage to the television set 150.

For instance, referring to FIG. 17, if another user uploads a new photo on a blog, the blog server 210 stores the photo, and provides all of the blog users with a message telling that the new photo is uploaded on the blog through the cellular phone 110.

The blog users can view the new photo through the cellular phone 110 immediately after finding the newly updated content message, or can set the photo as shared data and store it in the server 200 so as to find the photo through the television set 110.

Thus, a user can set data generated by other users as shared and use the data through any other connected device.

Figure 18:
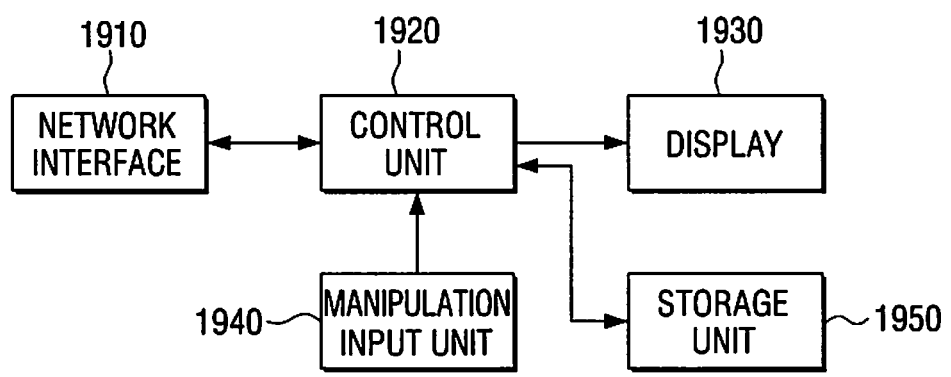
FIG. 18 illustrates a cellular phone.

FIG. 18 illustrates the cellular phone 110.

The cellular phone 110 may include of a network interface 1910, a control unit 1920, a display 1930, a manipulation input unit 1940, and a storage unit 1950.

The network interface 1910 is a connection path to enable the cellular phone 110 to communicate with the server 200 through a network. Particularly, the network interface 1910 transmits the shared data to the server 200 through the network.

The display 1930 displays the shared data transmitted through the network interface 1910 or the data stored in the storage unit 1950 under the control of the control unit 1920.

The manipulation input unit 1940, connecting to a mouse, a keyboard, or others, receives user manipulation such as setting the data as shared, and transmits the user manipulation to the control unit 1920.

The control unit 1920 controls the implementation of the cellular phone 110. Specifically, the control unit 1920 implements the data stored on the storage unit 1950 or implements the display 1930 to display the shared data from the server 200 through the network interface 1910. Additionally, the control unit 1920 sets the stored data as shared and transmits them to the server 200 according to the input user manipulation of the manipulation input unit 1940.

The storage unit 1950 saves software programs to implement the shared data from the server 200 or to implement the cellular phone 110. The storage unit 1950 may be implemented in a medium such as a hard disk or a non-volatile memory.

The constitution of other devices (120, 130, 140, or 150) may be considered based on the constitution of the cellular phone 110.

Figure 19:
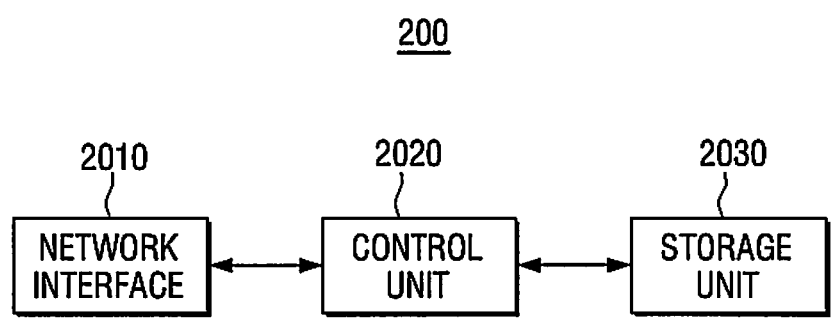
FIG. 19 illustrates the server.

FIG. 19 illustrates the server 200.

The server 200 may include of a network interface 2010, a control unit 2020, and a storage unit 2030.

The network interface 2010 is a connection path to enable the server 200 to communicate with other registered devices through the network. Particularly, the network interface 2010 receives shared data from other devices such as the cellular phone 110 through the network.

The control unit 2020 controls the implementation of the server 200. Specifically, the control unit 2020 implements the shared data from other devices such as the cellular phone 110 to be stored in the storage unit 2030, and transmits the shared data according to requests of the other devices.

The storage unit 2030 stores software programs to implement the shared data from the other devices and to implement the server 200. The storage unit 2030 may be implemented in a medium such as a hard disk or a non-volatile memory.

As explained above, the shared data can be transmitted and received by utilizing the server 200. However, without using the server 200, devices can share the data according to the present invention, which will be explained below with reference to FIG. 20.

Figure 20:
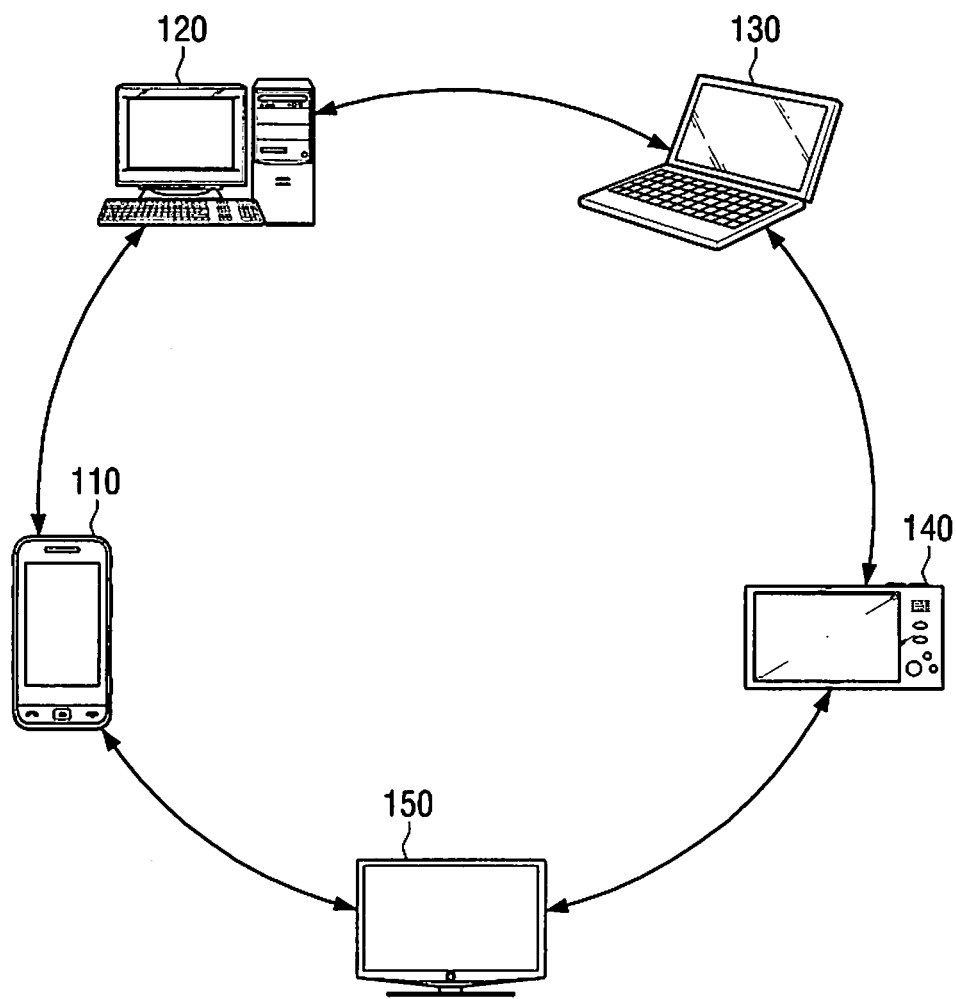
FIG. 20 illustrates a data transmitting system according to the present invention.

FIG. 20 illustrates a data transmitting system according to the present invention.

In the data transmitting system of the above embodiment, a user select data according to his or her needs from the plurality of the data stored in a device, and the selected data are shared with other devices. Specifically, this data transmitting system implements ad hoc operation without the server 200.

Thus, each device stores its own data. If one device requires the data stored in other devices, it implements ad hoc connection to the other devices, detects and shares the data.

For instance, the data transmitting system may include of a personal area network and a body area network, and may intercommunicates according to methods such as Bluetooth®, ZigBee®, Electrical Field Communication, and Near Field Communication.

In the system, each device receives device and user information of other devices, analyzes a Mac address, an available application type, and a device type, and receives the shared data according to the analysis.

Particularly, each device immediately transmits its data to the other devices upon communicating with the other devices.

The above embodiments explain that the cellular phone 110 transmits the searched webpages by surfing webs and that the digital camera 140 transmits the photo data to the server, and calls the data as shared. Selecting and transmitting the data to the server is a clipping process.

The clipping process may be implemented in one or more devices connecting to the network, and the clipped data are transmitted to the server and stored in the server. The clipped data can be called as contents.

Clipping devices may clip one of images, texts, audios and others according to manipulation. The clipping process will be further explained in detail below.

Figure 21:
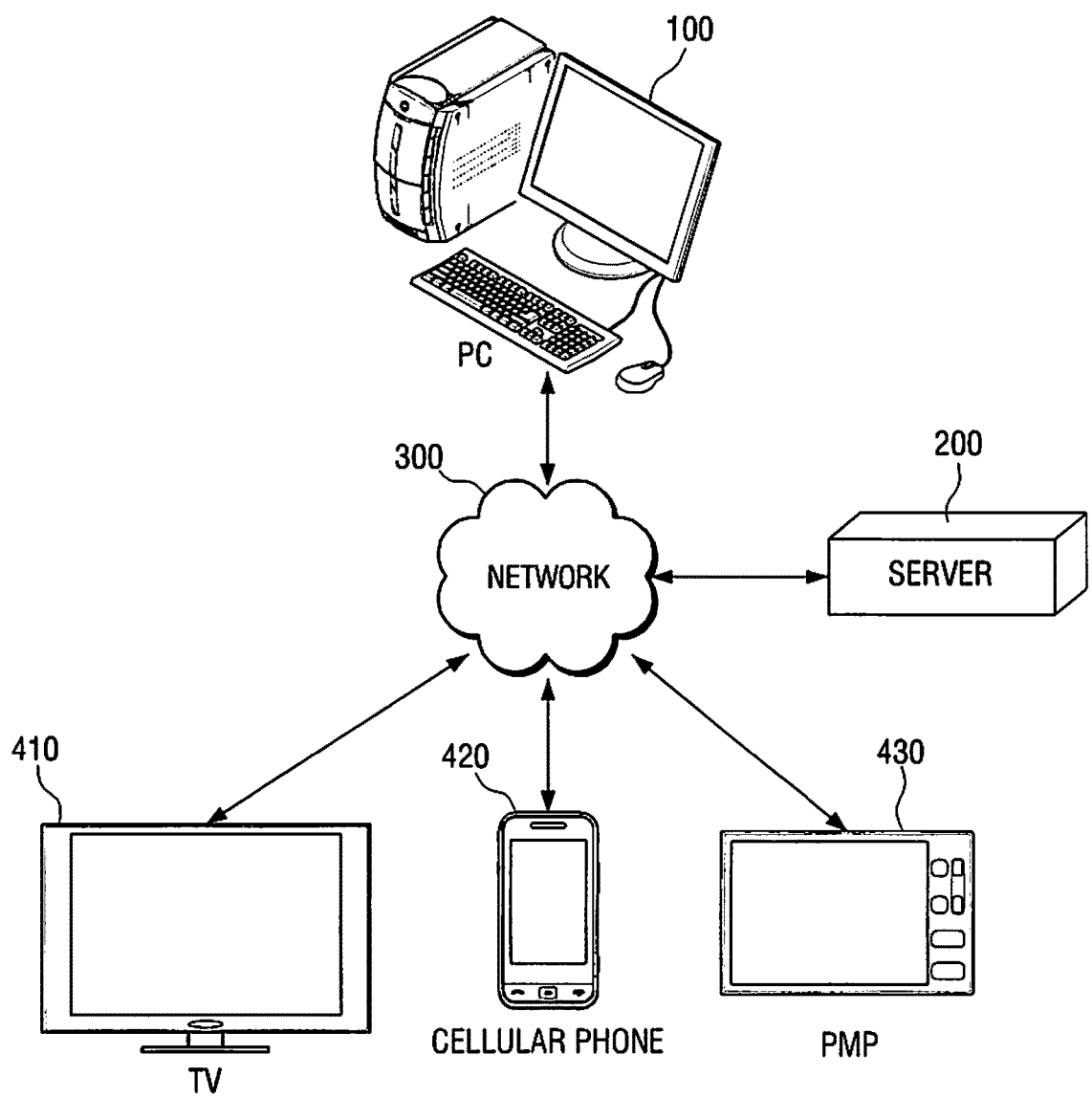
FIG. 21 illustrates a clipping system according to the present invention.

FIG. 21 illustrates a clipping system according to the present invention. The clipping system according to this exemplary embodiment selects contents from the plurality of the contents according to his or her needs, or provides a user with some part of a content according to his or her needs.

This system may include of the personal computer 100, the server 200, and other devices (410, 420, and 430). FIG. 21 illustrates that the personal computer 100 implements the clipping process.

The personal computer 100, mainly used at home or office, displays contents stored in the personal computer 100, or displays contents downloaded from other devices by connecting to the Internet through the network 300. Additionally, the personal computer 100 may transmit and receive contents by communicating with the server 200 and other devices (410, 420, and 430) through the network 300.

Particularly, the personal computer 100 may clip part of the contents displayed on a screen by utilizing manipulation devices such as a mouse, and transmit the clipped data to the server 200 through the network 300. The server 200 stores the contents received from the server 200.

As explained above, the server 200 stores the contents received from the personal computer 100 through the network 300 and transmits the stored data to the other devices (410, 420, and 430) accessing to the server 200 through the network 300.

Meanwhile, the server 200 analyzes information regarding other devices (410, 420, and 430) accessing to the server 200 through the network 300, and determines allowing access of the devices (410, 420, and 430) based on the analysis.

For instance, the server 200 may allow access of the devices (410, 420, and 430) if the personal computer 100, and the other devices (410, 420, and 430) are manufactured by one company, or if the personal computer 100 and other devices (410, 420, and 430) are used by one user. However, if the personal computer 100 has no interrelationship with other devices (410, 420, and 430) through the information analyzed regarding the personal computer 100 and other devices (410, 420, and 430), the server 200 may allow the access by utilizing authorization process such as ID and password.

The devices (410, 420, and 430) connect to the server 200 through the network 300, and receive contents, particularly, clipped contents stored in the server 200. In the present embodiment, the devices (410, 420, and 430) are a television set 410, a cellular phone 420, and a PMP 430.

The television set 410 is mainly used at home while the cellular phone 420 and a PMP 430 are mainly carried with. Thus, if a user clips contents through the personal computer 100 at home or office, the clipped contents are stored in the server 200.

Thus, the user can enjoy the clipped content in a more convenient or mobile environment by connecting to the server 200 with the television set 410, the cellular phone 420, and the PMP 430 to the server 200.

Additionally, since the user can find the previously selected content or the part of the content without watching all of the contents, the system provides the user with a more efficient environment to view contents.

Figure 22:
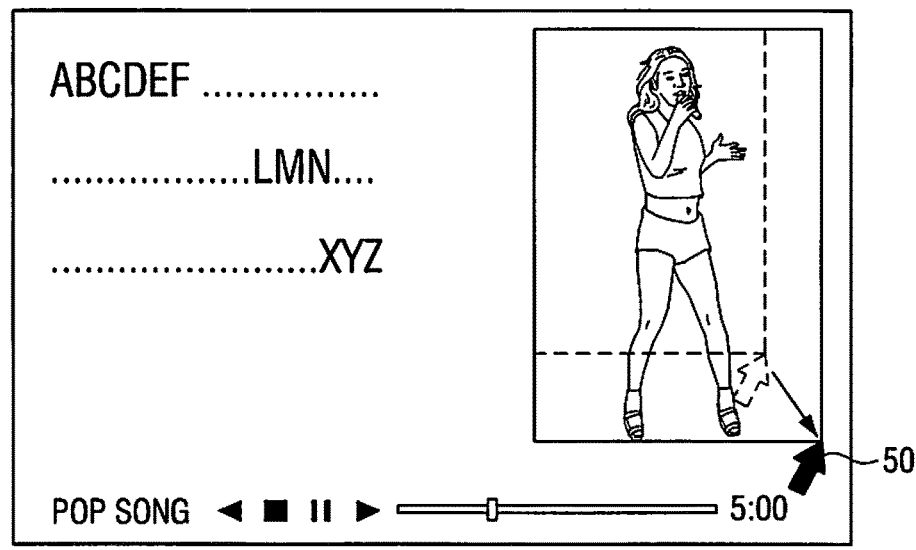
Figure 23:
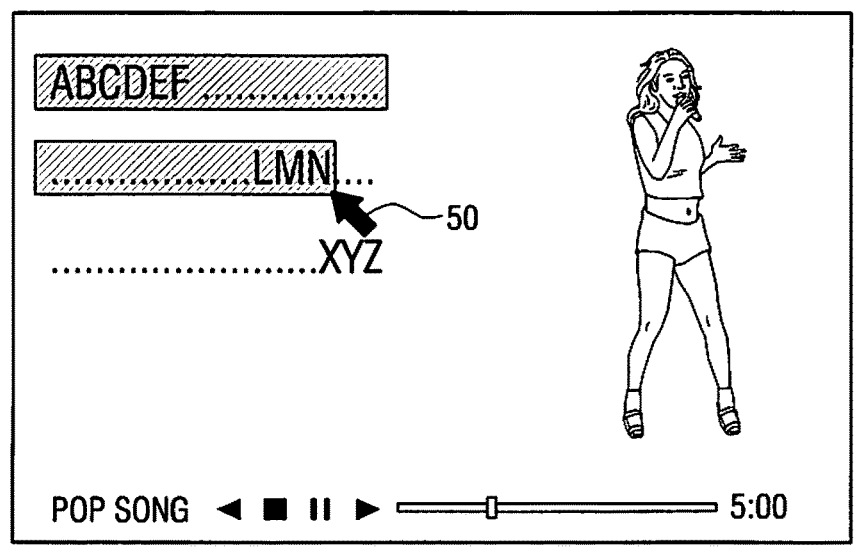
Figure 24:
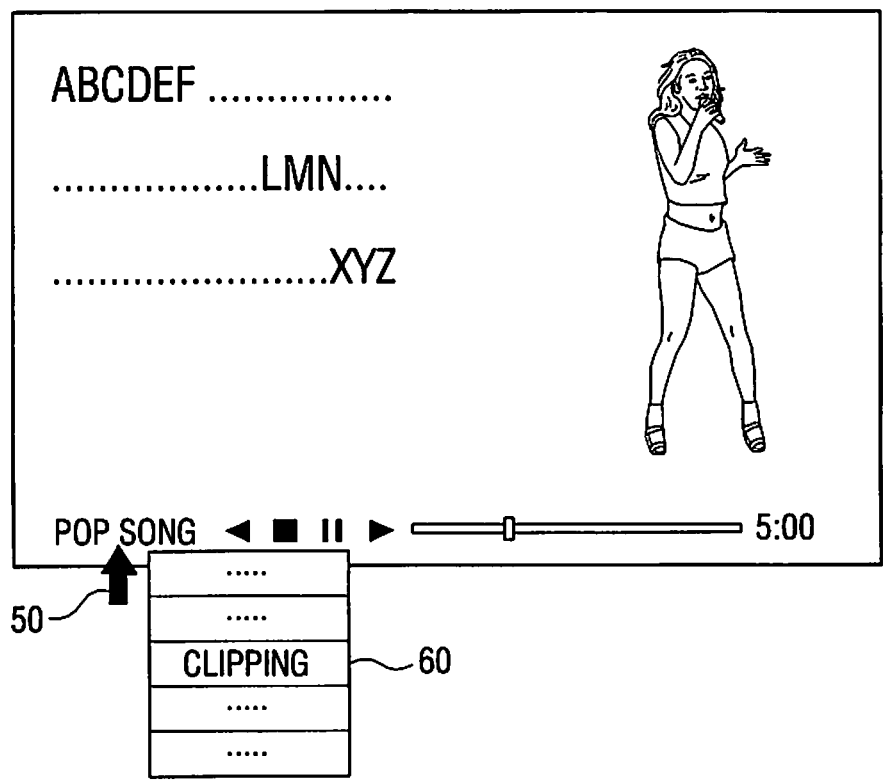

FIG. 22 illustrates an image clipping process, FIG. 23 illustrates a text clipping process, and FIG. 24 illustrates an audio clipping process, each of which according to the present invention.

Referring to FIG. 22, the personal computer 100 displays text contents in the upper left of the screen, image contents in the upper right of the screen, and audio content items in the lower of the screen.

If a user wants to only clip image contents in the upper right of the screen, the user draws a box around the image contents by utilizing an arrow 50 on the screen.

The user may separately store and view parts of image contents according to his or her needs.

Meanwhile, referring to FIG. 23, if a user wants to clip the text contents in the upper left screen and view the contents, he or she highlights parts of the text contents with the arrow 50 and clips the highlighted text contents.

Thus, the user may separately store and view text contents according to his or her needs.

Referring to FIG. 24, if a user tries to clip audio contents while playing, he or she can select and clip the audio contents by implementing the display of manipulation contents 60 around items regarding audio contents playing, and by selecting clipping of the manipulation contents 60.

Thus, the user enjoys part of the audio contents according to his or her needs.

If contents are provide from online websites, the personal computer 100 stores website addresses and clips contents that a user requests, enabling a user to access clipped contents more easily and conveniently.

Figure 25:
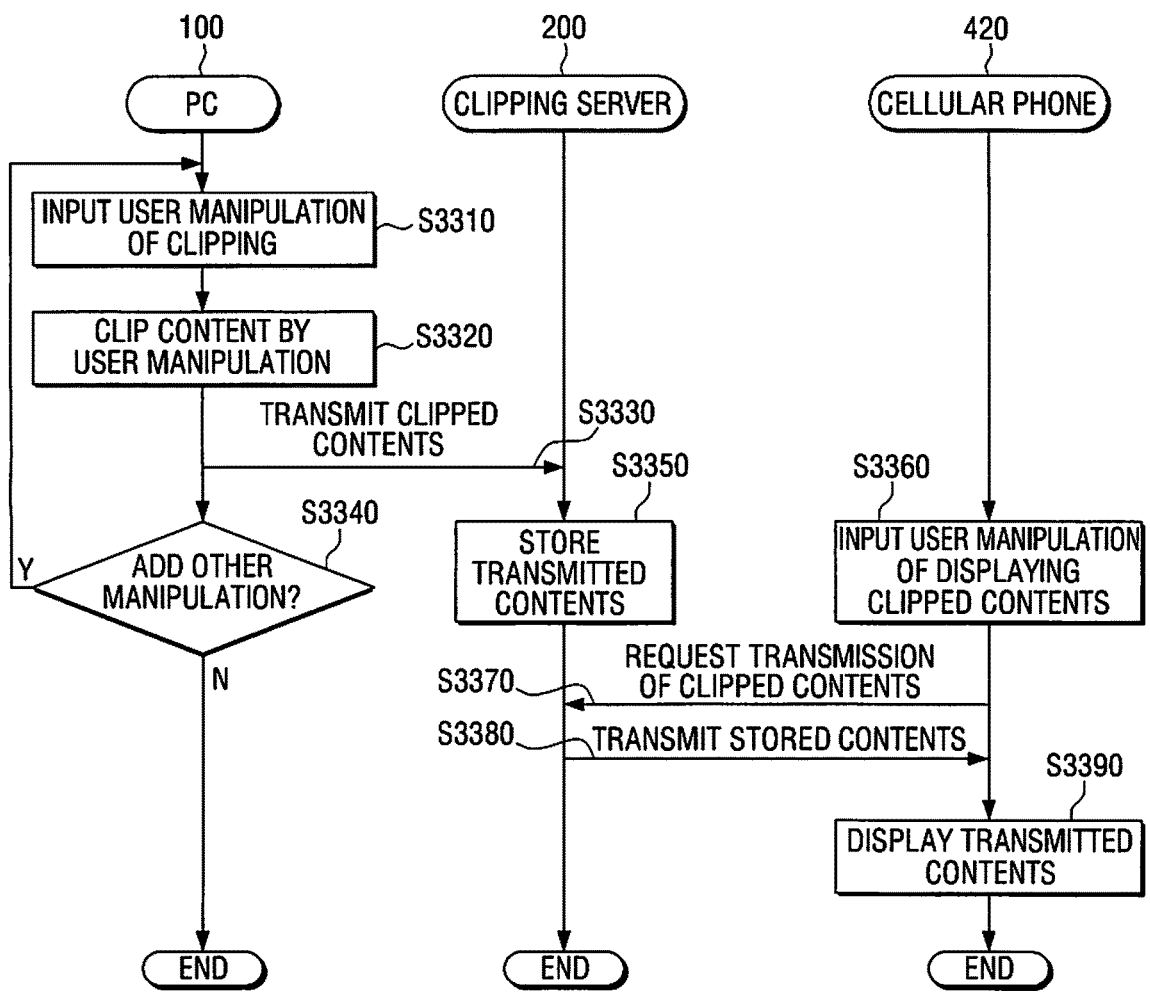
FIG. 25 illustrates a process of a content clipping method according to the present invention.

FIG. 25 illustrates a process of a content clipping method according to the present invention. The content clipping method will be explained below mainly based on the cellular phone 420.

Referring to FIGS. 22 to 24, if a user manipulation regarding clipping is inputted at S3310, the personal computer 100 clips contents according to user manipulation at S3320.

The personal computer 100 transmits the clipped contents to the server 200 at S3330, and if additional clipping manipulation is inputted at S3340—Y, the process repeatedly implements from S3310, S3320, to S3330.

The server 200 stores contents transmitted from the personal computer 100 at S3350.

If the cellular phone 420 is input manipulation to output the clipped contents from a user at S3360, the cellular phone 420 transmits a message to request the clipped contents transmission to the server 200 at S3370.

The server 200 transmits the clipped contents to the cellular phone 420 at S3380, and the cellular phone 420 displays the contents from the server 200 at S33900.

Thus, a user can separately view contents that be or she wants, or view the clipped contents in a more convenient environment, or view the clipped contents while carrying the devices.

A constitution of the personal computer 100 in FIG. 21 may correspond to the constitution of the cellular phone 110 in FIG. 18. Clipping contents and transmitting the contents to the server 200 can be implemented by not only the personal computer 100 in FIG. 21 but also other devices (410, 420, and 430) in FIG. 21 or the cellular phone 110, the personal computer 100, the laptop computer 130, and the digital camera 140, and the television set 150 in FIG. 1.

A clipping process under the condition that the personal computer 100 has constitution as in FIG. 18 will be explained in detail below.

The network interface 1910 is a connection path to enable the personal computer 100 to communicate with the server 200 or other devices 410, 420, and 430 through the network 300. Particularly, the network interface 1910 transmits the clipped contents to the server 200 through the network 300.

The display 1930 displays contents received from external devices through the network interface 1910 or stored in the storage unit 1950 under the control of the control unit 1920.

The manipulation input unit 1940, connected to a mouse or a keyboard, receives user manipulation regarding content clipping process and transmits it to the server 200.

The control unit 1920 controls the manipulation of the personal computer 100. Specifically, the control unit 1920 displays contents stored in the storage unit 1950 or contents received from external devices through the network interface 1910 according to user manipulation input from the manipulation input unit 1940. Additionally, the control unit 1920 selects some contents or parts of the content to be clipped from the contents, which are stored in the storage unit 1950 or received from external devices through the network interface 1910, according to user manipulation input from the manipulation input unit 1940.

The storage unit 1950 stores software programs to implement the contents received from external devices or the personal computer 100. The storage unit 1950 may be implemented in a medium such as a hard disk or non-volatile memory.

Constitution of the cellular phone 420 and other devices (410 and 430) may be considered from the constitution of the personal computer 100.

If the personal computer 100 clips contents, the server 200 in FIG. 19 may store the clipped contents, and transmit the clipped data to other devices.

Alternatively, the personal computer 100 stores the clipped contents and other devices 410, 420, and 430 receives the clipped contents by accessing to the personal computer 100 through the network 300.

In addition, image clipping, text clipping, and audio clipping, which are explained above, are merely embodiments of contents clipping. The present teaching can be applied to other contents clipping such as video clipping.

The present teaching can also be applied to other clipping methods as well as the methods of clipping images, texts, and audios as explained above.

The server 200 may process and store data transmitted from external devices as explained above.

Processing data optimizes or selects data according to devices using the data or according to user characteristics, which may include user preference or user selection records.

The server 200 may map the processed data on the devices using the data. If the server 200 clips the data that can be transmitted to a terminal device, it converts format, resolution, size or others of the data for the terminal devices, maps the converted data on the terminal device, and stores the converted data. The server 200 may transmit the data upon connecting to the terminal device. Mapping can be implemented by various standards.

For instance, the server 200 may store data records that each user receives. Although the data receiving records can be provided from users, the provision of these records is also manageable by the server 200. The server 200 records and utilizes the number of connecting using data, clipping and the data type. According to user records, the server 200 may previously select contents to transmit to the user, and transmit the contents upon accessing to the user. If the server 200 clips new image data and one of other devices usually receives image data, it may maps the new image data on the device before connecting to the device. Thus, the server 200 transmits the new image data upon connecting to the device usually receiving image data.

Additionally, devices clipping data may receive information of device using data. A user of the personal computer 100 can previously select terminal devices of other related users. The data clipped by the personal computer 100 can be transmitted to the selected terminal devices upon connecting to the server.

Additionally, mapping can be implemented based on various user information such as job title, position, department of employment, and company.

The foregoing embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A method of transmitting data performed by a server through a network, the method comprising:
   receiving and storing data from a device of a first user;
   detecting that a device of a second user accesses the server;

selecting data from the stored data based on user information;

processing the selected data to be optimized for the device of the second user; and transmitting the processed data to the device of the second user, wherein the server is configured to combine data received from a plurality of devices of the first user and transmit the combined data to the device of the second user.

2. The method of claim 1, wherein storing data comprises storing data tables mapping devices using metadata of the data, and transmitting the processed data comprises transmitting the metadata mapped to the device of the first user, if the device of the first user recorded on the data tables is connected.

3. The method of claim 1, further comprising;

selecting data from the stored data according to information of the device of the second user, wherein the information of the device of the second user includes information regarding a relationship between the device of the first user and the device of the second user.

4. The method of claim 3, wherein the selected data is processed to be implemented in the device of the second user based on the information of the device of the second user.

5. The method of claim 1, wherein transmitting the processed data comprises transmitting the processed data, if a level of data transmission authorization is less than or equal to a level of authorization of the device of the second user.

6. The method of claim 1, wherein the user information includes information of authorization of the device of the second user set by a relationship, and transmitting the processed data comprises transmitting the processed data by comparing data transmission authorization that the processed data transmission requests, with the authorization of the device of the second user.

7. The method of claim 6, wherein transmitting the processed data comprises transmitting the processed data, if a level of the data transmission authorization is less than or equal to a level of authorization of the device of the second user.

8. The method of claim 1, wherein the processed data transmitted to the device of the second user is updated on the device of the first user or set by a user through the device of the first user.

9. The method of claim 8, further comprising receiving keywords inputted to the device of the first user by user manipulation, wherein transmitting the processed data comprises selecting the processed data based on the keywords, and transmitting the processed data to the device of the second user.

10. The method of claim 1, wherein the device of the second user is a user terminal set by a user through the device of the first user.

11. The method of claim 10, further comprising receiving keywords inputted to the device of the first user by user manipulation, wherein transmitting the processed data comprises selecting the device of the second user based on the keywords, and transmitting the processed data to the device of the second user.

12. The method of claim 1, wherein transmitting the processed data comprises generating metadata of the selected data and transmitting the metadata with the selected data to the device of the second user.

13. The method of claim 12, wherein, if the selected data or the metadata is transmitted, the device of the second user displays at least one of the selected data or the metadata by automatically implementing an application to nm the selected data or to display the metadata.

14. The method of claim 1, wherein transmitting the processed data comprises transmitting the processed data to the device of the second user after receiving a transmission request of the stored data from the device of the first user, if the device of the second user connects to the network.

15. The method of claim 1, wherein the data from the device of the first user is at least one of photos, videos, voices, addresses, telephone numbers, searching results, and webpages stored in at least one of the device of the first user and the device of the second user.

16. The method of claim 1, wherein the device of the second user provides a user with a user interface (UI) to determine whether the selected data is displayed, and implements an application to display the selected data according to user manipulation of the UI.

17. The method of claim 1, wherein storing the data comprises combining and storing data received from a plurality of first devices, if there are at least two first devices, and transmitting the processed data comprises transmitting integrally stored data to the device of the second user, if the device of the second user connects to the network.

18. A method of transmitting data in an ad hoc network, the method comprising:

receiving and storing data from a device of a first user;

detecting that a device of a second user accesses the ad hoc network;

selecting data from the stored data based on user information;

processing the selected data to be optimized for the device of the second user; and transmitting the processed data to the device of the second user, wherein a server is configured to combine data received from a plurality of devices of the first user and transmit the combined data to the device of the second user.

19. A server, comprising:

a communication interface configured to transmit and receive data to and from a device of a first user and a device of a second user through a network;

a storage unit configured to store the data received from the device of the first user; and a control unit configured to detect that the device of the second user accesses the server, select data from the stored data based on user information, process the selected data to be optimized for the device of the second user, and transmit the processed data to the device of the second user, wherein the server is configured to combine data received from a plurality of devices of the first user and transmit the combined data to the device of the second user.

20. A data transmitting system, comprising:

a device of a first user configured to connect to a network and transmit stored data to a server;

a device of a second user configured to connect to the network and receive data from the server; and a server configured to receive and store the data, detect that the device of the second user connects to the network, select data from the received and stored data based on user information, process the selected data to be optimized for the device of the second user, and transmit the processed data to the device of the second user, wherein the server is configured to combine data received from a plurality of devices of the first user and transmit the combined data to the device of the second user.

* * * * *